United States Patent
Krauthamer et al.

(10) Patent No.: US 11,938,630 B2
(45) Date of Patent: Mar. 26, 2024

(54) EDIBLE SOFT ROBOTIC SYSTEMS AND METHODS

(71) Applicant: Universal City Studios LLC, Universal City, CA (US)

(72) Inventors: Akiva Meir Krauthamer, Orlando, FL (US); Kimberly Anne Humphreys, Orlando, FL (US); Aaron Chandler Jeromin, Winter Garden, FL (US); Elam Kevin Hertzler, Winter Garden, FL (US); Timothy Fitzgerald Garnier, Leesburg, VA (US)

(73) Assignee: Universal City Studios LLC, Universal City, CA (US)

( * ) Notice: Subject to any disclaimer, the term of this patent is extended or adjusted under 35 U.S.C. 154(b) by 771 days.

(21) Appl. No.: 16/994,896

(22) Filed: Aug. 17, 2020

(65) Prior Publication Data
US 2021/0060766 A1    Mar. 4, 2021

Related U.S. Application Data

(60) Provisional application No. 62/910,868, filed on Oct. 4, 2019, provisional application No. 62/894,405, filed on Aug. 30, 2019.

(51) Int. Cl.
*A63G 31/12* (2006.01)
*A63G 31/00* (2006.01)
(Continued)

(52) U.S. Cl.
CPC .............. *B25J 9/142* (2013.01); *A63G 31/00* (2013.01); *B25J 9/0015* (2013.01); *B25J 11/0045* (2013.01); *A63F 2250/022* (2013.01)

(58) Field of Classification Search
CPC ........ A63G 31/00; A63G 31/12; A63H 33/00; A63H 3/08; A23G 3/50; A23G 1/545
(Continued)

(56) References Cited

U.S. PATENT DOCUMENTS

| 4,003,142 A * | 1/1977 | Morrison .................. A63H 9/00 |
| | | 219/475 |
| 4,068,007 A | 1/1978 | Forkner |

(Continued)

FOREIGN PATENT DOCUMENTS

| CN | 105358181 A | 2/2016 |
| CN | 105377448 A | 3/2016 |

(Continued)

OTHER PUBLICATIONS

CN Office Action for Chinese Application No. 202080060866.5 dated Jun. 6, 2023.
(Continued)

*Primary Examiner* — Kien T Nguyen
(74) *Attorney, Agent, or Firm* — Fletcher Yoder P.C.

(57) ABSTRACT

An edible soft robot system may be used to display and/or interact with edible inflatable objects. In an embodiment, the edible inflatable object is configured to receive a fluid in an internal compartment. The edible inflatable object may be reversibly coupled to a container, wherein coupling the edible inflatable object to the container comprises aligning a port of the edible inflatable object to a fluid conduit to fluidically couple the internal compartment to the fluid conduit. A control system of the edible soft robot system is configured to receive instructions to adjust inflation of the internal compartment by activating fluid flow into or out of the internal compartment via the fluid conduit, wherein adjusting inflation of the internal compartment causes the edible inflatable object to actuate on or within the container.

14 Claims, 20 Drawing Sheets

(51) Int. Cl.
*B25J 9/00* (2006.01)
*B25J 9/14* (2006.01)
*B25J 11/00* (2006.01)

(58) Field of Classification Search
USPC .......................... 472/134; 446/220, 226, 386
See application file for complete search history.

(56) References Cited

U.S. PATENT DOCUMENTS

| | | | |
|---|---|---|---|
| 6,486,126 B1* | 11/2002 | Prasad | A61P 7/00 536/18.1 |
| 7,350,477 B1* | 4/2008 | Tilford | A23G 3/2076 118/308 |
| 10,888,798 B1* | 1/2021 | Vaca | A63H 33/00 |
| 2011/0303693 A1 | 12/2011 | Culley et al. | |
| 2015/0352813 A1 | 12/2015 | Galloway et al. | |
| 2015/0366547 A1 | 12/2015 | Galloway et al. | |
| 2015/0366695 A1 | 12/2015 | Galloway et al. | |
| 2017/0203443 A1 | 7/2017 | Lessing et al. | |
| 2017/0291806 A1 | 10/2017 | Lessing et al. | |
| 2017/0341238 A1 | 11/2017 | Lessing et al. | |
| 2018/0169869 A1 | 6/2018 | Chiappetta et al. | |
| 2018/0281188 A1 | 10/2018 | Rosenstein et al. | |
| 2018/0281194 A1 | 10/2018 | Rosenstein et al. | |
| 2018/0281200 A1 | 10/2018 | Rosenstein et al. | |
| 2018/0281201 A1 | 10/2018 | Rosenstein et al. | |
| 2018/0304473 A1 | 10/2018 | Lessing et al. | |
| 2018/0311829 A1 | 11/2018 | Curhan et al. | |
| 2018/0319018 A1 | 11/2018 | Knopf et al. | |
| 2018/0325507 A1 | 11/2018 | Lessing et al. | |
| 2018/0326579 A1 | 11/2018 | Lessing et al. | |
| 2018/0326597 A1 | 11/2018 | Lessing et al. | |
| 2018/0353870 A1 | 12/2018 | Baumholtz et al. | |
| 2019/0009415 A1 | 1/2019 | Lessing et al. | |
| 2019/0030714 A1 | 1/2019 | Knopf et al. | |
| 2019/0039838 A1 | 2/2019 | Curhan et al. | |
| 2019/0047156 A1 | 2/2019 | Curhan et al. | |
| 2019/0061170 A1 | 2/2019 | Curhan et al. | |
| 2019/0084165 A1 | 3/2019 | Curhan et al. | |
| 2019/0099897 A1 | 4/2019 | Lessing et al. | |
| 2019/0111571 A1 | 4/2019 | Curhan et al. | |
| 2019/0143538 A1 | 5/2019 | Curhan et al. | |
| 2019/0145455 A1 | 5/2019 | Curhan et al. | |
| 2019/0168382 A1 | 6/2019 | Lessing | |
| 2019/0168398 A1 | 6/2019 | Lessing et al. | |
| 2019/0168399 A1 | 6/2019 | Lessing et al. | |

FOREIGN PATENT DOCUMENTS

| | | |
|---|---|---|
| CN | 107704088 A | 2/2018 |
| CN | 107847958 A | 3/2018 |
| DE | 19743398 A1 | 4/1999 |
| EP | 0349841 A1 | 1/1990 |
| JP | 2006204104 A | 8/2006 |
| WO | 2012148472 A2 | 11/2012 |
| WO | 201679644 A1 | 5/2016 |

OTHER PUBLICATIONS

PCT/US2020/047599 Invitation to Pay Additional Fees Dec. 2, 2020.
Screen captures from YouTube video clip entitled "Soft Pneumatic Gelatin Actuator for Edible Robotics," uploaded on Jun. 3, 2019 by user "IEEE Spectrum". Retrieved from Internet: https://www.youtube.com/watch?time_continue=58&v=BNIUcq-KUBI.
"Edible Robots Made of Gelatin Can be Used In Search and Rescue, Medicine, and More," Research Brief, Oct. 18, 2017, 7 pgs.
Shintake, Jun, et al.; "Soft Pneumatic Gelatin Actuator for Edible Robotics,", arXiv:1703.01423v1, Mar. 4, 2017, 6 pgs.
Alba, Michael, "Soft Robots That Bend and Twist Like Human Fingers," Engineering.com, Dec. 28, 2016, 3 pgs.
Screen captures from YouTube video clip entitled "DIY Soft Robotic Tentacle," uploaded on Jun. 23, 2016, by user "Harrision Young". Retrieved from Internet: https://www.youtube.com/watch?v=gPYjo-W2ctU.
Watkin, Hanna; "Soft Robotics Hand Improves Robot-Human Interactions," All3DP, Dec. 31, 2015, 4 pgs.
Screen captures from YouTube video clip entitled "Caterpillar Soft Robot Powered by Light," uploaded on Aug. 19, 2016, by user "SciNews". Retrieved from Internet: https://www.youtube.com/watch?v=gJ-slzbhmo4.
Pennisi, Elizabeth; "Robotic stingray powered by light-activated muscle cells," ScienceMag.org, Jul. 7, 2016, 11 pgs.
Screen captures from YouTube video clip entitled "Swimming Soft Robot Controlled by Light," uploaded on Dec. 7, 2015, by user "Science Editor". Retrieved from Internet: https://www.youtube.com/watch?v=y8zd0n1Pv_Q.
Screen captures from YouTube video clip entitled "High-Force Soft Printable Pneumatics for Soft Robotic Applications," uploaded on Sep. 14, 2016, by user "Nus Ei Lab". Retrieved from Internet: https://www.youtube.com/watch?v =_X0rDW6NQ58.
Screen captures from YouTube video clip entitled "3D-printed 'soft' robotic tentacle displays new level of agility," uploaded on Oct. 14, 2015, by user "Cornell University Media Relations & News". Retrieved from Internet: https://www.youtube.com/watch?v=BZ5W7LyyKL0.
Screen captures from YouTube video clip entitled "Soft Robot based on Honeycomb Pneumatic Networks," uploaded on Aug. 22, 2016, by user "Tiao Tiao". Retrieved from Internet: https://www.youtube.com/watch?v=uoKHcbz-ieM.
Screen captures from YouTube video clip entitled "Meet the World's First Completely Soft Robot," uploaded on Dec. 16, 2016, by user "MIT Technology Review". Retrieved from Internet: https://www.youtube.com/watch?v=DfHehxz_-Hc.
Screen captures from YouTube video clip entitled "The incredible potential of flexible, soft robots | Giada Gerboni," uploaded on Jul. 5, 2018, by user "TED". Retrieved from Internet: https://www.youtube.com/watch?v=AI7M-JTC6_w.
Screen captures from YouTube video clip entitled "Soft Robot Walking and Crawling," uploaded on Nov. 29, 2011, by user "IEEE Spectrum". Retrieved from Internet: https://www.youtube.com/watch?v=2DsbS9cMOAE.
Screen captures from YouTube video clip entitled "Soft Robots," uploaded on Feb. 3, 2016, by user "nature video". Retrieved from Internet: https://www.youtube.com/watch?v=A7AFsk40NGE.

* cited by examiner

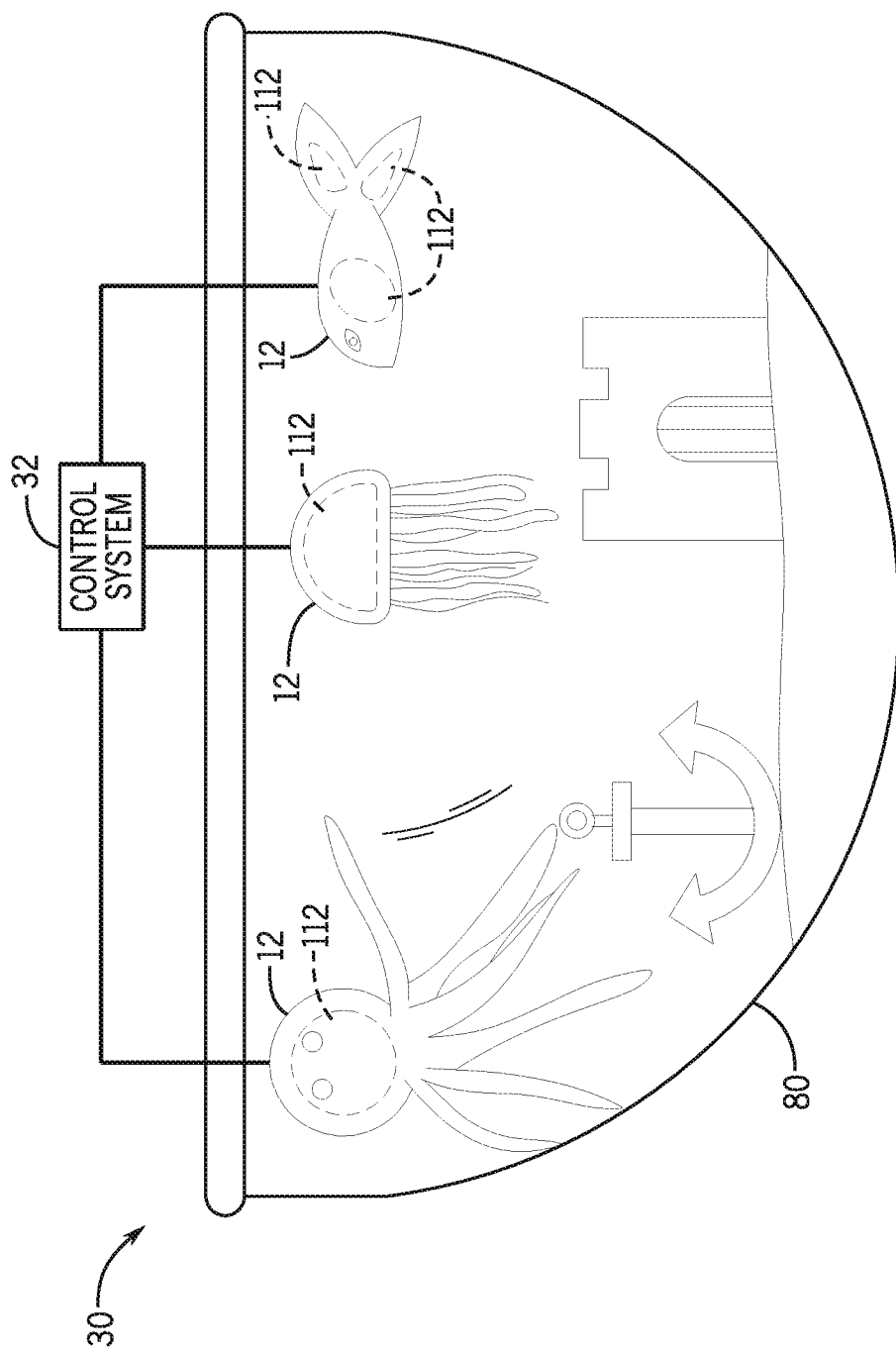

EDIBLE SOFT ROBOTIC SYSTEMS AND METHODS

CROSS-REFERENCE TO RELATED APPLICATIONS

The present disclosure claims priority to and the benefit of U.S. Provisional Application No. 62/894,405, entitled "EDIBLE SOFT ROBOTIC SYSTEMS AND METHODS," and filed on Aug. 30, 2019, and U.S. Provisional Application No. 62/910,868, entitled "EDIBLE SOFT ROBOTIC SYSTEMS AND METHODS," filed on Oct. 4, 2019, the disclosures of which are incorporated by reference for all purposes.

BACKGROUND

The present disclosure relates generally to the field of amusement parks. More specifically, embodiments of the present disclosure relate to systems and methods for providing and enhancing amusement park experiences related to edible soft robotic systems.

Various amusement rides and exhibits have been created to provide guests with unique interactive, motion, and visual experiences. Such experiences may be designed to stimulate multiple senses, including touch, smell, and taste. In various rides and exhibits, guest experiences may be enhanced by employing certain interactive robotic features within the rides and exhibits. However, such robotic features may be costly and ill-suited to being incorporated into disposable and/or consumable products that guests may touch, smell, and taste.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an edible soft robot system is provided that includes at least one edible inflatable object formed at least in part from an edible material and that includes an internal compartment configured to receive a fluid and one or more sensors configured to generate sensor data indicative of a parameter of the system. The system also includes a control system coupled to the at least one edible inflatable object. The control system is configured to receive sensor data from the one or more sensors, adjust inflation of the at least one edible inflatable object by directing fluid into or out of the internal compartment based on the sensor data, and activate one or more special effects based on the sensor data.

In an embodiment, an edible inflatable object display system is provided that includes an edible inflatable object configured to receive a fluid in an internal compartment of the edible inflatable object and a container to which the edible inflatable object is reversibly coupled. The reversible coupling comprises a port of the edible inflatable object aligned with a fluid conduit such that the fluid conduit is fluidically coupled the internal compartment. The system also includes a control system configured to receive instructions to adjust inflation of the internal compartment by activating fluid flow into or out of the internal compartment via the fluid conduit. Adjusting the inflation of the internal compartment causes the edible inflatable object to actuate on or within the container.

In an embodiment, an edible soft robot system is provided that includes an interactive surface having a plurality of elements arranged in an array. The plurality of elements include fluid conduit elements, sensor elements, and effects elements. The edible soft robot system includes a plurality of edible inflatable objects disposed on the interactive surface such that each individual edible inflatable object is in contact with at least one element of the plurality of elements. The edible soft robot system further includes a control system configured to control activation of the plurality of elements to cause at least one edible inflatable object of the plurality of edible inflatable objects to actuate by adjusting inflation of an internal compartment of the at least one edible inflatable object of the plurality of the edible inflatable objects.

In an embodiment, an edible inflatable object display system is provided that includes an edible inflatable object holding a fluid in a closed internal compartment of the edible inflatable object. The edible inflatable object display system also includes a container within which the edible inflatable object is displayed, a fluid conduit extending into an interior of the container, and a pump configured to activate fluid flow into or out of the interior of the container via the fluid conduit to cause the edible inflatable object to actuate within the container.

In an embodiment, an edible inflatable object system is provided. The system includes an edible inflatable object configured to receive a fluid in a recess of the edible inflatable object. The system also includes a tray to which the edible inflatable object is reversibly coupled, wherein the tray comprises a through passage aligned with the recess. The system also includes a counter, wherein the tray is positioned between the counter and the edible inflatable object, and a grommet extending through the counter and having a grommet passage that aligns with the through passage to fluidically couple the recess to a fluid delivery system, wherein the tray and the counter comprise complementary mating features that, when mated, align the grommet passage and the through passage.

DRAWINGS

These and other features, aspects, and advantages of the present disclosure will become better understood when the following detailed description is read with reference to the accompanying drawings in which like characters represent like parts throughout the drawings, wherein:

FIG. 6 is a schematic illustration of a portable arrangement of an edible soft robot system implemented as an interactive toy, in accordance with embodiments described herein;

DETAILED DESCRIPTION

Figure 1:
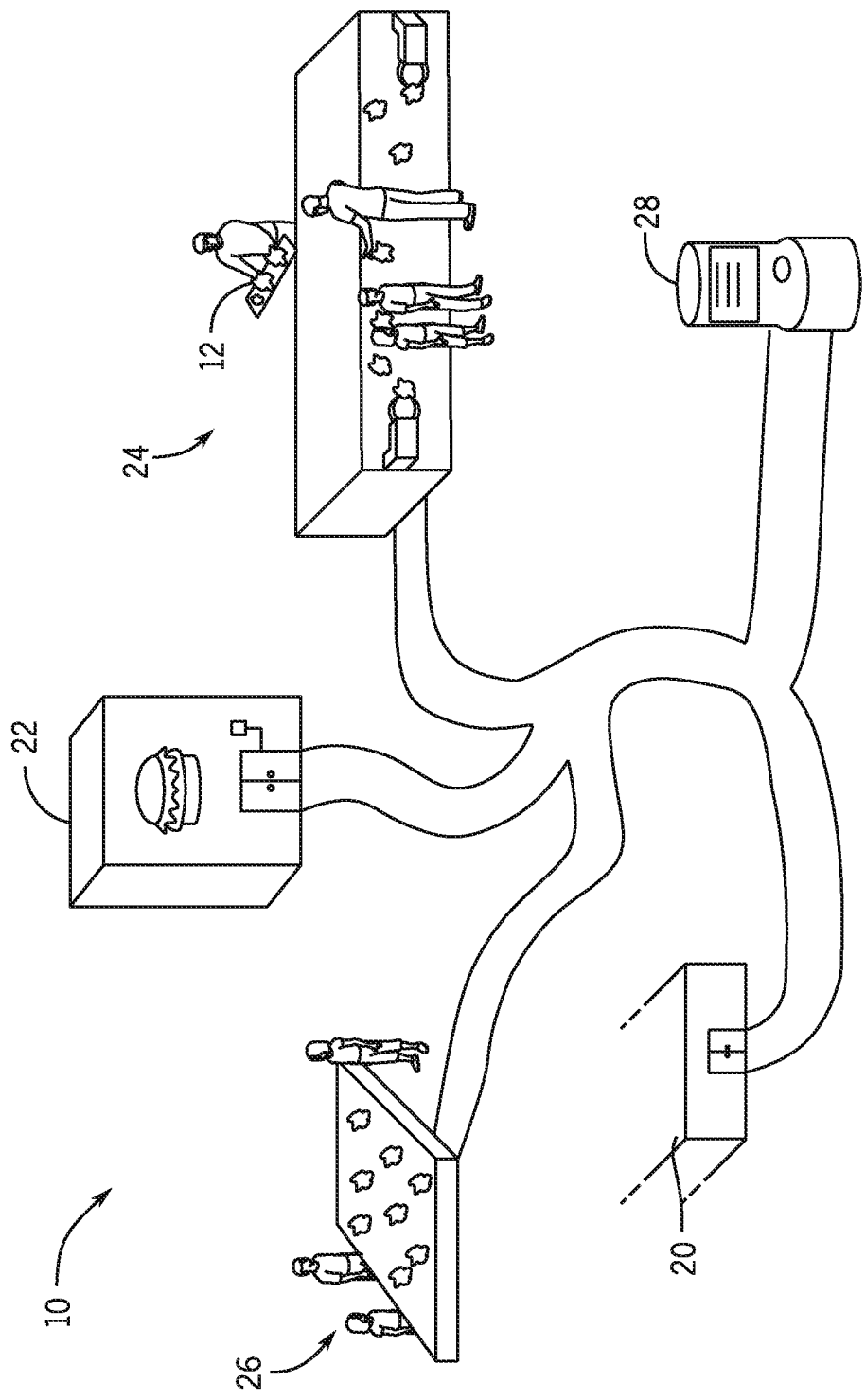
FIG. 1 is a schematic illustration of an amusement park that includes an edible soft robot system, in accordance with embodiments described herein.

One or more specific embodiments will be described below. In an effort to provide a concise description of these embodiments, not all features of an actual implementation are described in the specification. It should be appreciated that, in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It is now recognized that various mechanical devices used in amusement park environments may lack interactive components that may physically contact guests. For example, robots may have rigid surfaces and moving joints that are not designed to operate while being physically contacted by guests. Further, many robots serve as installation pieces, and are not designed to be portable or consumable products that guests can touch or even eat. Provided herein are soft robots, e.g., pneumatic or hydraulic inflatable objects that may be employed to create dynamic movement and that are edible and/or consumable. In this manner, an amusement park or other narrative may be expanded to include interactive experiences with a taste element to expand sensory immersion. For example, edible soft robots may be capable of being actuated in conjunction with show effects such as light effects and/or sound effects to achieve complex effects that are not typically associated with food products. Edible soft robots may be coupled to control systems that facilitate actuation and any accompanying show effects to permit pre-programmed, responsive, and/or customized actuations. Such control systems may be incorporated into traditional food containers (e.g., plates, trays, cups, utensils, food packaging) to conceal control system that function to activate the edible soft robots as part of an eating experience. For example, edible soft robots may be activated to squirm in response to being touched. In an embodiment, the soft robots may be implemented in shapes or configurations that are not traditional food items or food presentations, but that may create enjoyment or enhance a narrative as part of an immersive environment. In an embodiment, the soft robots may be configured as edible wearables, toys, creatures, building materials, and the like and that actuate in a manner consistent with the desired effect. For example an edible bracelet may be presented in a display setting that permits one or more "jewels" to expand (i.e., inflate) when the packaging is handled.

Actuation is achieved by directing gas and/or liquid through a collapsible or inflatable material that is designed to be consumed by the guest. As used herein, edible soft robot systems may include balloon-like or inflatable objects with internal bladder/s or compartment/s that receive gas and/or liquid to form a discernable shape or to transition between different configurations. In this manner, soft robot systems may be used to form dynamic shapes, bodies, or structures that may be difficult to create using food materials.

FIG. 1 is a schematic illustration of an implementation of an environment, such as an amusement park 10, that may include one or more edible soft robot systems that facilitate guest interaction with edible inflatable objects 12, in accordance with present embodiments. It should be understood that the environment is by way of example, and other contexts for use in conjunction with the edible soft robot systems are also contemplated. The amusement park 10 may include features such as attractions or rides 20, restaurants 22, retail establishments 24, interactive exhibits 26, and automated distribution or interaction kiosks 28. For example, edible inflatable objects 12 may be available as menu items in the restaurant 22, may be available as samples or for purchase in edible inflatable object 12 stores, may be distributed as part of a queue for a ride or attraction 20, may be interacted with using dedicated interactive surfaces in the interactive exhibit 26, or may be customized, activated, or purchased at a kiosk 28. The embodiments discussed in FIGS. 2-27 are examples of the types of implementations that are contemplated. It should be understood that the disclosed embodiments are by way of example and that elements of the various embodiments may be combined or exchanged with one another. Further, while certain embodiments are discussed in the context of an amusement park 10 and interactions with amusement park guests, other contexts are also contemplated, including at-home, free-standing retail, or other uses.

Figure 2:
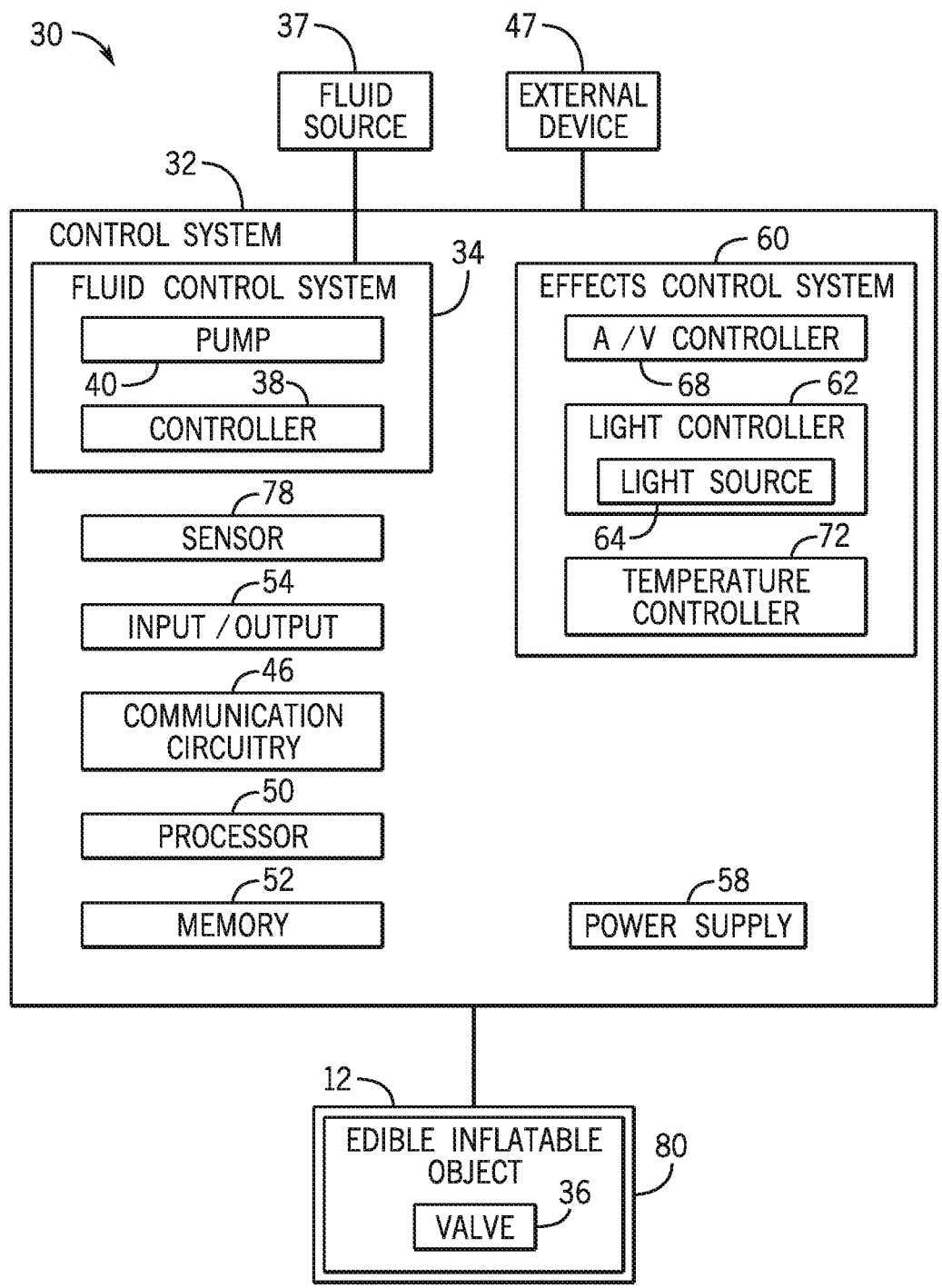
FIG. 2 is a block diagram of an edible soft robot system, in accordance with embodiments described herein.

FIG. 2 is a block diagram of an edible soft robot system 30 according to the disclosed techniques to control motion and/or effects used in conjunction with an edible inflatable object 12. The edible inflatable object 12 may be formed from any suitable material that may form a desired shape when inflated with a fluid (e.g., gas or liquid). In an embodiment, the edible inflatable object 12 is capable of assuming at least two configurations based on varying fluid fill. As provided herein, the edible inflatable object 12 may be formed from biocompatible and edible materials that are capable of being actuated via fluid injection into one or more internal bladders or compartments. In an embodiment, the edible inflatable object 12 may be formed from one or more edible materials such as starch, cellulose and derivatives, alginate, chitosan, collagen, gelatin or glycerin. The edible inflatable object 12 may also include one or more flavor and/or color additives or preservatives. In an embodiment, the edible inflatable object 12 is a candy.

The edible inflatable object 12 may be formed from molding or extruding an edible material such that one or more internal compartments are created. The internal compartment or compartments may be accessed via respective valves 36 (e.g., a check valve) and/or fluid ports, which may be an edible component integrally formed with or otherwise coupled to the edible inflatable object 12, or may be a separate component, e.g., a rigid polymeric or metal component coupled to the edible inflatable object 12 via a backing or base. In embodiments, the edible inflatable object 12 may include one or more sealed compartments that are not accessible by any opening or valve 36. The edible inflatable object 12 may be formed from a single edible material or from multiple different edible materials joined together or assembled in layers, depending on the desired end properties. In an embodiment, the edible inflatable object 12 may be manufactured as separate components that are assembled to form the edible inflatable object 12. For example, a complex or relatively thin piece may be molded separately from a thicker piece to reduce errors from molding components with different material qualities within a single mold.

Further, the edible inflatable object 12 may be at least partially conformable such that, when deflated, the internal compartment folds or collapses in on itself in a deflated configuration. The inflatable object 12 may also assume one or more inflated configurations, depending on a fill level of the internal compartment. The edible inflatable object 12 may, in an embodiment, be formed from an elastic material that expands when inflated. Accordingly, certain portions of the edible inflatable object 12 may be thinner or thicker to achieve desired material properties.

In an embodiment, the edible inflatable object 12 may be formed from a recipe that includes cold water, granulated sugar, and corn syrup in a 1:2/3:1/3 ratio. The recipe also may include gelatin (e.g., in a ratio of cold water to gelatin of 1:1/16) and citric acid (e.g., in a ratio of in a ratio of cold water to citric acid of 1:1/150-1:1/200). The sugar and corn syrup are dissolved in water. The gelatin is added. The mixture is allowed to bloom, and is heated over a double boiler. Citric acid and desired color and flavor may be added. The mixture is poured into molds, allowed to set, and removed to form the edible inflatable object 12.

The edible inflatable object 12 is coupled to a control system 32 that controls fluid delivery to one or more internal compartments of the edible inflatable object 12 via a fluid control system 34. The fluid control system 34 may be coupled to a fluid source 37 stored in a fluid reservoir and/or may be configured to provide ambient air to the edible inflatable object 12. The fluid control system 34 operates under a controller 38 that controls activation of a pump 40 that may pump fluid into or out of the edible inflatable object 12. The fluid control system 34 may be communicatively coupled to one or more manifolds, one or more valves, one or more flow meters, one or more sensors, one or more conduits (e.g., tubing) and the like to direct fluid flow into and/or out of the edible inflatable object 12.

The fluid control system 34 may be configured to switch between multiple fluid sources 37 based on instructions from the control system 32 to change a nature of the inflation of the edible inflatable object 12. For example, as discussed herein, different selectable flavored liquids may be used to enhance the taste of the edible inflatable object 12. In an embodiment, the edible inflatable object 12 may be configured to provide liquid or wind effects based on the type of fluid used for inflation.

The control system 32 may include communication circuitry 46, a processor 50, a memory 52, an input/output (I/O) port 54, a power supply 58 (e.g., wired power, a battery) and the like. The communication circuitry 46 may facilitate wired or wireless communication between various components of the control system 32 as well as with external devices 47, such as user mobile devices, active wearables, or central or local controllers of the amusement park 10 (see FIG. 1). The processor 50 may be any suitable type of computer processor or microprocessor capable of executing computer-executable code. The processor 50 may also include multiple processors that may perform the operations described herein. The memory 52 may also be used to store the data, various other software applications, and the like that are executed by the processor 50. The memory 52 may represent non-transitory computer-readable media (e.g., any suitable form of memory or storage) that may store the processor-executable code used by the processor 50 to perform various techniques described herein. The I/O ports 54 may be interfaces that may couple to other peripheral components such as input devices (e.g., keyboard, mouse), sensors, input/output (I/O) modules, and the like. The power supply 58 may provide power to one or more components of the control system 32. The components of the control system 32 may be integrated on or within a container 80 that couples to or holds the edible inflatable object 12. The container 80 may conceal at least part of the control system 32 from view of the guests.

The control system 32 may also include an effects control system 60 that controls one or more special effects or show effects that may be activated in conjunction with inflation or configuration changes of the edible inflatable object 12 and under processor control. The effects control system 60 and/or the fluid control system 34 may be controlled based on data from one or more sensors 78. In an embodiment, the effects control system 60 may control lighting effects via a lighting controller 62 coupled to a light source 64. In an embodiment, an LED or similar light source 64 may be positioned inside the edible inflatable object 12. This light may then illuminate the edible inflatable object 12 from the inside. The light source 64 may be located inside one of the inflatable air chambers in the edible inflatable object 12 or in a non-inflating space embedded in the edible inflatable object 12. The light source 64 may be powered from wires that run through an air tight hole in the wall of the edible inflatable object 12 air chamber. The light source 64 may be powered via a wireless power technology such as magnetic coupling or UHF power harvesting. The light source 64 may be located outside of the edible inflatable object 12 attached to a fiber optic cable or similar internal reflector. The other end of the fiber optic cable is inserted into the edible inflatable object 12 such that the edible inflatable object 12 is illuminated from the inside.

In an embodiment, traditional architectural/theatrical lighting may be used to light the edible inflatable object 12 from the outside. The colors and directions of the incoming light may interact with the colors/material properties of the edible inflatable object 12 surface and/or subsurface to create creative effects. For example a red-colored edible inflatable object 12 under green light will appear dark since all the incoming red light is absorbed. Another example is an edible inflatable object 12 with a surface texture similar to a diffraction grating with many tiny ridges. This may cause a diffraction of white light that bounces off of the surface. Light source/s 64 may be placed under a piece of edible inflatable object 12 to create an up-lighting effect. The lights may be embedded in a base upon which the edible inflatable object 12 rests. For example LEDs may be built into a table or retail packaging to light the edible inflatable object 12.

The control system 32 may be configured to generate audio/visual (A/V) effects under control of an A/V controller 68. In an embodiment, the edible inflatable object 12 may include valves 36, resonance chambers, vibrating membranes and other traditional music generating hardware may be made from the material of the edible inflatable object 12. As such the edible inflatable object 12 may generate its own sounds in response to targeted fluid flow (e.g., inflating and venting at appropriate times. Accordingly, the control system 32 may coordinate the fluid control system 34 to achieve desired sounds. For example, an edible inflatable object 12 character may "sing" different notes to create a song. In an embodiment, the edible inflatable object 12 may wirelessly communicate with another device via ultrasonic waves generated from internal fluid flow. This type of audio may be manipulated in real time by the user touching different parts of the edible inflatable object 12. The force of the users touch cause the edible inflatable object 12 and/or air to vibrate differently and thus change the sounds. Traditional audio effects and music may be also used in connection with the edible inflatable object 12 experience. For example, the control system 32 may include a speaker to play music in time with the motion of the animated edible inflatable object 12.

Other types of effects may include olfactory effects. Traditional smell effects may be used in conjunction with the edible inflatable object 12. Smells may come up through the edible inflatable object 12, come from another location, or the smell may be in the air inside the edible inflatable object 12 and come out when the edible inflatable object 12 is first deflated. In one embodiment the inside of the edible inflatable object 12 has a strong smell. When air enters the internal air chambers, the air picks up some of the smell. When that air leaves the edible inflatable object 12, it will bring the smell with it to the guest.

Wind effects may be created by allowing controlled release of air out of a portion of the edible inflatable object's 12 internal compartment. This may also be turned on and off, directed, or limited based on the motion of the edible inflatable object 12. This wind effect may then reach the guests skin so that they may sense it. In one embodiment the wind effect reaches other objects in the space to move them for creative effect. For example a wind effect leaves the edible inflatable object 12 and blows on nearby paper confetti causing it to shake. Traditional wind effects may be used in conjunction with the edible inflatable object 12 experience. For example, the effects control system 60 may control an external fan that blows onto the edible inflatable object 12 to augment actuation caused by inflation/deflation changes.

The control system 32 may also be configured to activate heating and cooling effects. Heating and cooling effects may be applied to the edible inflatable object 12 via a temperature controller 72. This temperature change may have mechanical and creative effects on the edible inflatable object 12. For example, the edible inflatable object 12 may be used as a game piece (e.g., in an interactive exhibit 26, see FIG. 1), and a portion of the edible inflatable object 12 may be melted at a moment in a game experience when the player loses. In an embodiment, the edible inflatable object 12 may be cooled when not in use and not activated (but still on display) to retain shape in the atmospheric heat. Upon activation or triggering of actuation, the edible inflatable object 12 may be heated to increase flexibility and facilitate smooth actuation.

In one embodiment, the edible inflatable object's 12 temperature is changed by way of heating or cooling the air before it is moved into the internal compartment inside the edible inflatable object 12. This may allow for location specific heating/cooling based on which internal compartments are used. In one embodiment the edible inflatable object's 12 temperature is changed via a heating/cooling element in contact with the edible inflatable object 12. This contact may be heat transfer from a surface that the edible inflatable object 12 is resting on, built into an air barb that is inside the edible inflatable object 12, or some other position on the edible inflatable object 12 surface. In one embodiment the edible inflatable object 12 is heated remotely from the outside. For example a hot air jet located above the edible inflatable object 12 may heat the outside surface of the edible inflatable object 12.

The edible inflatable object 12 may generate effects using liquid within the internal compartment/s. In one example, water may be sprayed out from the edible inflatable object 12. This water may be stored inside the edible inflatable object 12 or may be pumped into the edible inflatable object 12 by way of a tube connection. The water may be colored, flavored or otherwise customized to match the theming needs. For example "blood" spraying out of a heart. For example, the edible inflatable object 12 may include one or more unidirectional valves that release the water once the pressure inside the internal compartment reaches a threshold. The water effect may be realized by continuing to increase the pressure in the internal compartment by continuing fluid flow into the internal compartment (under control of the fluid control system 34) until the pressure release valves are opened.

Water or liquid inside the edible inflatable object 12 may be used to create effects whereby the edible inflatable object 12 dissolves from the inside. Dissolving effects may also be created with water or other liquid running across the outside surfaces of the edible inflatable object 12. Water may be used for visual effect inside chambers of the edible inflatable object 12. This might take the form of clear edible inflatable object 12 with colored water moving on the inside. Traditional water effects may be used in conjunction with the edible inflatable object 12 experience. For example a nozzle (not mounted to the edible inflatable object 12) may spray the guest with water at a particular moment during the experience.

The control system 32 may be configured to generate haptic effects by actuating the edible inflatable object 12 via air inflation and deflation such that the edible inflatable object 12 itself functions as a haptic device. Additional contemplated effects include atmospheric effects (such as fog machines) or projection effects. Projection mapping effects may be used on both the inside and outside of the edible inflatable object 12 surface in conjunction with the edible inflatable object 12. The projections may update in real time to match the state/pose of the edible inflatable object 12. Video backdrops may be used in conjunction with the edible inflatable object 12 experience, and the video screens may be located under the edible inflatable object 12 or may be positioned to be viewed through the edible inflatable object 12. Augmented reality and virtual reality devices may be used to enhance the visuals surrounding the edible inflatable object 12 experience. The visuals may be updated in real time to match the state of the edible inflatable object 12. The edible inflatable object 12 may also be updated in real time to match the state of the visuals.

As provided herein, the fluid control system 34 and/or the effects control system 60 may be activated in response to sensed parameters relating to the system 30, such as proximity of a user or other edible inflatable objects 12, temperature of the system 30 or the edible inflatable object 12, pressure on the edible inflatable object 12, and/or contact with the edible inflatable object 12. That is, one or more of inflation, deflation, and effect activation may be responsive to sensor data generated by one or more sensors 78. In an embodiment, the sensor 78 may be a capacitive touch sensor attached to the edible inflatable object 12 such that the sensor may detect the edible inflatable object 12 being touched. For example, the control system 32 may detect guest's proximity to/touching of the edible inflatable object 12, and this may be used as input to trigger actuation. In addition, this may be used to trigger association of the edible inflatable object 12 with an individual guest, e.g., via triggering the communication circuitry 46 to communicate with a guest device. The control system 32 may detect proximity of the edible inflatable object 12 to other edible inflatable objects 12 or the physical connection points. This may be useful for experiences with more than one edible inflatable object 12 interacting with one another. The control system 32 may detect if the edible inflatable object 12 is attached to the control system correctly.

The sensor 78 may be a resistive touch sensor coupled to the edible inflatable object 12 such that the sensor may detect parts of the edible inflatable object 12 touching other parts of the same edible inflatable object 12 or to detect if the edible inflatable object 12 is attached to the control system correctly. The sensor 78 may detect if another object (part of the electrical circuit) is touching the edible inflatable object 12 (such as a stylus or knife). Additional contemplated sensors 78 include optical sensors that sense light through edible inflatable object 12, laser range finder, IR distance sensor, or cameras. The sensor 78 may be a pressure sensor coupled to the edible inflatable object 12 or to an air tube attached to the edible inflatable object 12. The sensor 78 may then measure the pressure inside the edible inflatable object 12. Since air pressure is based on the chamber or compartment volume, the amount of air inside the sensor may be used for sensing inflow/outflow of air as well as compression/expansion of the chamber.

In an embodiment, the edible inflatable object 12 may be formed into an audio sensor via a membrane, e.g., a wall of the edible inflatable object 12, that vibrates due to sound waves traveling through the air. This motion may then be detected in the manner of a microphone. For example a magnet may be embedded in, printed on, slotted into, or connected on the membrane. The motion of the magnet would then be picked up by wire coils. In another example, a vibration source (such as a speaker) and a sensor (such as a microphone) are both attached to the edible inflatable object 12. The shape, state, pose, and touched objects of the edible inflatable object 12 effect how the vibrations change between the source and the sensor. Thus information about the shape, state, pose, and touched objects may be deduced by analyzing the sensor data. Due to the shape-changing nature of the edible inflatable object 12, a calibration process may be used to generate base line readings in different states.

Multiple sensors may be coupled to the edible inflatable object 12. Sections of conductive and non-conductive material of the edible inflatable object 12 may be used to create separate circuit sections inside a single piece of edible inflatable object 12. This allows for more than one electrical sensor to be operational at the same time on the edible inflatable object 12. Time slicing (having different sensors take turns) may allow more than one sensor to operate at the same time. Additional sensors 78 may include buttons, cameras, microphones, readers, or a skeletal tracker.

It should be noted that the components described above with regard to the control system 32 are exemplary components and the control system 32 may include additional or fewer components as shown. Further, certain components of the control system 32 may be integral with or removable from the control system 32.

Figure 3:
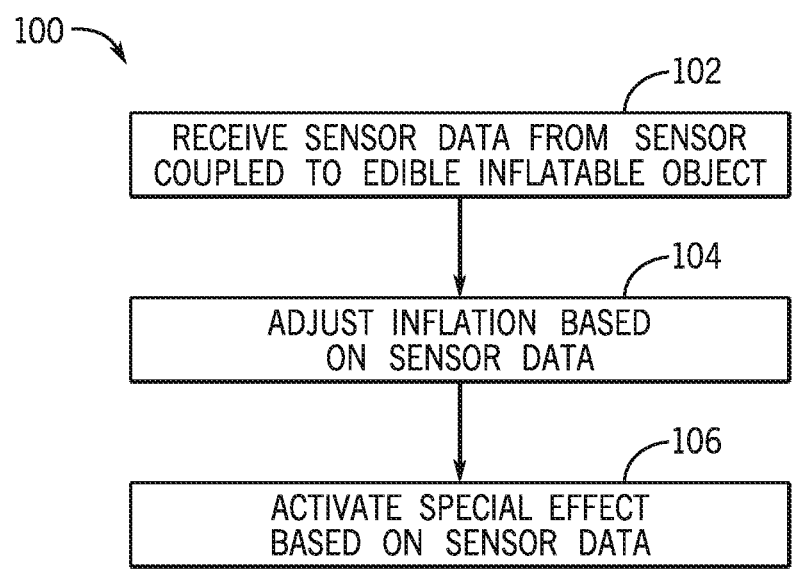
FIG. 3 is a flow diagram of an edible soft robot system technique, in accordance with embodiments described herein.

With the foregoing in mind, FIG. 3 illustrates an example flow chart of a method 100 for controlling the edible soft robot system 30 based on sensor data. At block 102, the control system 32 may receive a set of data from one or more sensors 78. The data may be proximity data, pressure data, audio data, etc. Based on the sensor data, the control system 32 may adjust the inflation of one or more internal compartments of the edible inflatable object 12 at block 104. In addition, the control system 32 may activate one or more special effects based on the sensor data at block 106. In a specific example, based on proximity of a customer in a store, the control system 32 may activate cycles of inflation/deflation in a chamber of the edible inflatable object 12 to create an animation effect.

The activation may involve pre-programmed animations (e.g., actuation of the edible inflatable object 12) using animation tools (such as key frames, graph curves, etc.) to control actuation of the edible inflatable object 12 and coordinated special effects. For example, the pre-programmed animation may include an ordered cycle of inflations and deflations to preset pressures within the internal compartment/s to achieve desired configurations. The method 100 may access the pre-programmed animation from the memory 52 and execute processor-based instructions to the fluid control system 32 and the effects control system 60.

In an embodiment, the edible inflatable object 12 positions (physical) are recorded ahead of time and then played back. Sensors 78 are used to determine the physical location of the edible inflatable object 12 is at the time of recording. Using sensors 78 coupled to the edible inflatable object 12, the guest may interact with the logic controlling the edible inflatable object 12 and special effect activation. In an embodiment, a video game engine may be used to drive the actuation based on game logic, real time physics simulations and/or networked multiplayer, etc. The system may use input such as live data feeds that include time of day, weather data, stock data, or profile information about the guest(s) viewing/interacting with the edible inflatable object 12 to influence the actuation and/or to select a pre-programmed actuation.

The edible inflatable object 12 may itself drive the actuation. For example using a set of valves 36 made from soft edible inflatable object 12, a Turing complete computer may be built. Alternatively a simpler computational device may be used for simple logic and animation functions in a manner similar to microfluidic logic. Using a data storage system such as provided herein, the edible inflatable object 12 has animation/logical data information directly stored as part of the edible inflatable object 12 itself. When the edible inflatable object 12 is attached to an external system, the data may be read and the animation or logical data (e.g., computer code) may be executed. In an embodiment, sections of the edible inflatable object 12 may have different properties that allow storage of data, including color, height/wall thickness, and density. When the edible inflatable object 12 is inflated the thinner sections will expand more than the thicker sections, offering one way to read this data. Additional integral data storage implementations include electrical conductivity of the edible inflatable object 12, electrical capacitance of the edible inflatable object 12, integral valves in the edible inflatable object 12 that are blocked or open by another object, chambers in the edible inflatable object 12 with check valves at the opening (also made from edible inflatable object 12) that may stay inflated or deflated, flip flop valves made from edible inflatable object 12. The disclosed embodiments provide the advantage of providing data storage directly coupled the edible inflatable object 12 and that is also edible (e.g., that does not utilize inedible data storage formats such as metal antennae). The edible inflatable object 12 may be actuated using punch card instructions that, when inserted into an opening in the container 80, selectively permit air flow from one side of the card to the other, such that only where there is a hole in the card may the air flow through. The edible inflatable object 12 is positioned on the far side of the card and is inflated based on the card hole positions without the data ever being digitized. By sliding the card forward into the container 80, the edible inflatable object 12 may be animated. Other potential data storage styles may include printing bar codes, QR codes, text, images, or color codes on the surface of the edible inflatable object 12 using edible ink. The data may be read using optical readers and then fed into the control system 32 to control the fluid control system 34 and/or the effects control system 60 based on the data encoded.

FIGS. 4-27 are examples of arrangements of arrangements of the edible soft robot system 30 or individual components thereof. It should be understood that the disclosed embodiments may include all or some of the disclosed elements of the edible soft robot system 30 of FIG. 2. Certain disclosed embodiments of the edible soft robot system 30 may be implemented as packaging or display systems for the edible inflatable object 12. Accordingly, the container 80 may be configured as a packaging assembly, a box, a tray, a table, a counter, tableware, a display case, etc.

Figure 4:
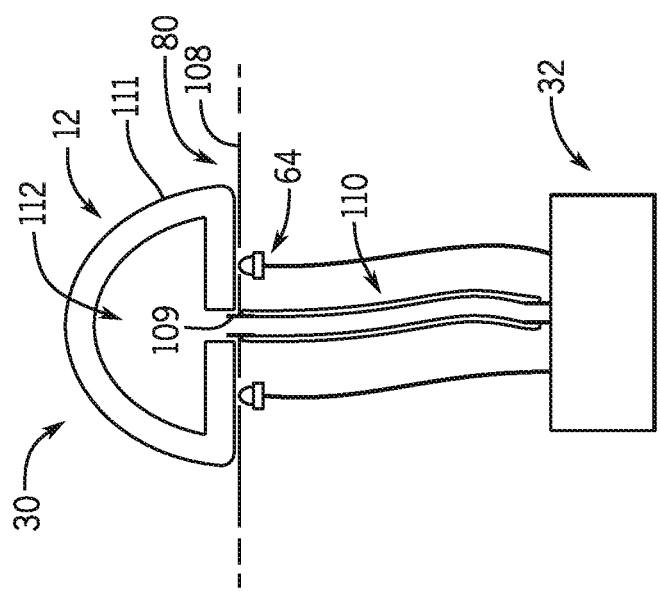
FIG. 4 is a schematic illustration of a table-top arrangement of an edible soft robot system, in accordance with embodiments described herein.

FIG. 4 is a schematic illustration of a cross-section or cutaway of counter or table-top style arrangement of the edible soft robot system 30 that may be suitable for a retail or restaurant display or as retail packaging. Various components of the control system 32 are positioned under a surface 108 of the container 80, implemented here as a counter, display case, or table. The edible inflatable object 12 may be reversibly or removably coupled to the surface 108 via a port 109. That is, one or more ports 109 formed in the edible inflatable object 12 allow air or other fluid to flow from a fluid conduit 110 extending through the surface 108 and between the pumps of the fluid control system 34 and into an internal compartment 112 of the edible inflatable object 12. The port 109 may extend from an exterior surface 111 of the edible inflatable object 12 to the internal compartment 112 to fluidically couple the fluid conduit 110 to the internal compartment 112.

The edible inflatable object 12 is positioned to align with the fluid conduit 110 in or on the container 80. Special effects, such as up lighting 64, may also be located in or under the counter surface 108. As disclosed herein, the show/interactive experience may include effects and actuation of the edible inflatable object 12 through a series of inflation/deflation events. Once the show/interactive experience is finished, the edible inflatable object 12 may be removed from the counter surface 108 (e.g., removed from a barb or protrusion formed by the fluid conduit and inserted within the port 109) and eaten. The container 80 may be retained and subsequently reloaded with fresh edible inflatable objects 12.

Figure 5:
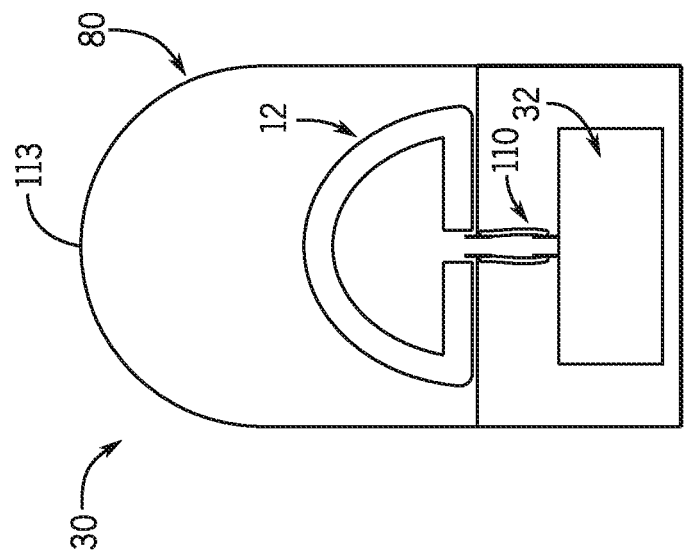
FIG. 5 is a schematic illustration of a portable arrangement of an edible soft robot system, in accordance with embodiments described herein.

FIG. 5 is a schematic illustration of a cross-section of a package or box-style arrangement of the edible soft robot system 30. Such an arrangement may be portable, and may be part of retail packaging. The control system 32 is located inside the container 80, which may be a box or a portable device such as a tray. The container 80 may serve as a retail display and may include a transparent window portion 113 that permits viewing of the edible inflatable object 12. In one embodiment, the edible inflatable object 12 is on display inside the container 80 before it is sold. After the edible inflatable object 12 is sold the guest may take the container 80 with them and continue watching/interacting with the edible inflatable object 12 until they are ready to remove it from the box and eat it. The container 80 may have a user input device (e.g., a button) to trigger activation of the actuation and any special effects. In one embodiment the container 80 is a tray that may be carried by a waiter. The waiter may bring the tray with the edible inflatable object 12 attached to show the edible inflatable object 12, which may be actively actuating, to show to the guests before it is removed by the guests to be eaten. In a portable arrangement the container 80 may not include an electrical control system such as a pump, but instead may utilize a portable power storage device such as a compressed air tank. This may allow the boxes to be smaller and cheaper. This tank may be located inside the actual box, but in the case of a waiter with a tray, the tank may be located on the waiter's body (for example in a backpack). The fluid conduit 110 may transmit air from the tank to the container 80.

In an embodiment, the edible inflatable object 12 can be used with the container 80 one or a limited number of times using stored energy within the edible inflatable object 12 itself and/or energy stored within the container 80. For example, an effect of the edible inflatable object 12 may be powered by the energy of fluid stored within a compartment of the edible inflatable object 12, an air bladder of the container 80, a coiled spring of the container 80, with potential energy stored by elastic material from which the edible inflatable object 12 is formed (e.g., stored energy via winding or stretching elastic material), or other one or limited capacity effects. However, the system 30 may permit a manual reset of the effect so that the effect may be viewed multiple times. In one example, an air bladder of the container 80 may be manually refilled or a spring may be pressed back into an energy-storing position. Further, if the effect is mediated by a release of air or fluid from a compartment of the edible inflatable object 12, refill objects 12 may be purchased and used in conjunction with the container 80.

FIG. 6 is a schematic illustration of a portable container 80 including the edible soft robot system 30 and implemented as an aquarium. The edible inflatable objects 12 are shaped like aquatic creatures, and are configured to actuate under control of the control system 32. The control system 32 may be concealed within the rocks or decorative features of the container 80. The edible inflatable objects 12 are coupled to a fluid source or are configured to receive ambient air via fluid conduits 110 (see FIG. 4). In an embodiment, the fluid conduit 110 may have separate outlets for separate internal compartments 112 to permit more granular control of actuation. For example, an octopus-shaped creature may have separate internal compartments 112 for each tentacle. In an embodiment, after the edible inflatable objects 12 are removed and consumed, refills may be obtained and connected to the control system 32 to permit the user to continue to enjoy additional iterations of the animation in the container 80. Accordingly, the fluid conduits may have universal connectors that couple to compatible edible inflatable objects 12.

Figure 7B:
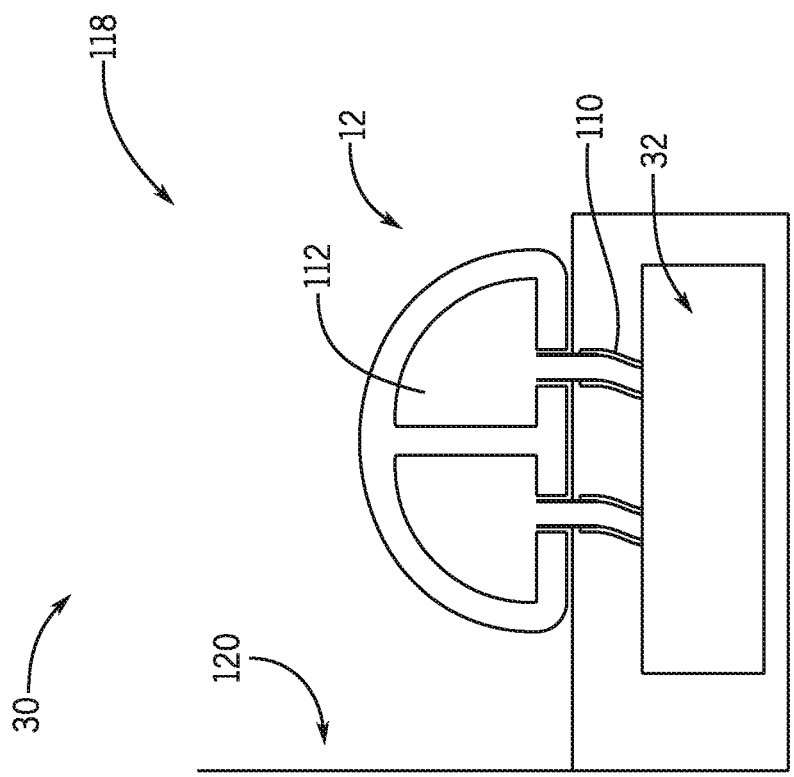
FIG. 7B is a schematic illustration of a console-based arrangement of an edible soft robot system, in accordance with embodiments described herein.
Figure 7A:
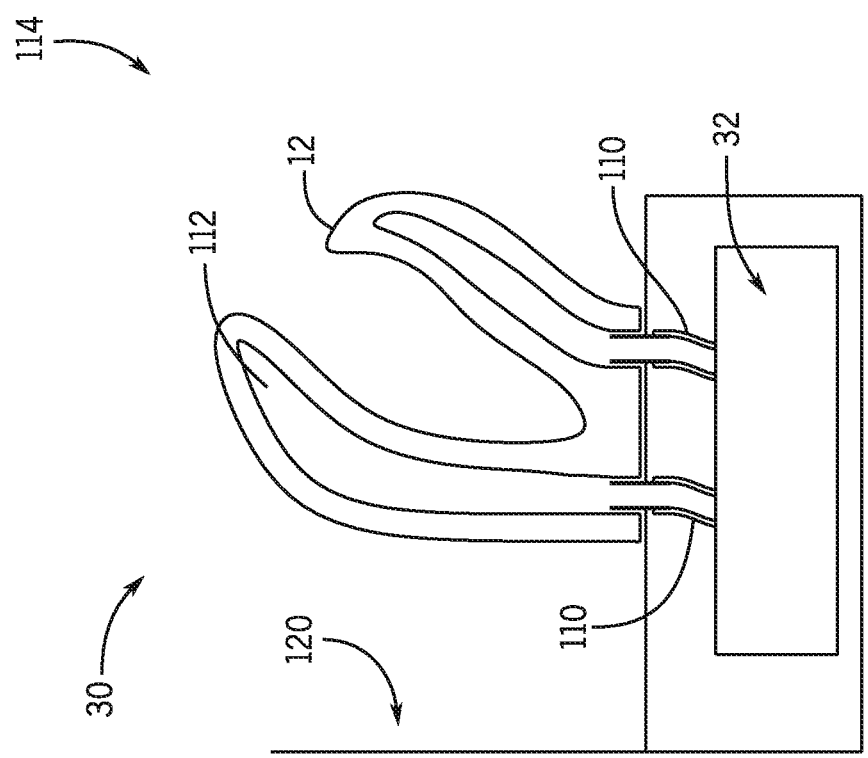
FIG. 7A is a schematic illustration of a console-based arrangement of an edible soft robot system, in accordance with embodiments described herein.

FIG. 7A and FIG. 7B are schematic illustrations of a cross-section of a console-style arrangement of the edible soft robot system 30 in which the control system 32 is enclosed in a console such as a kiosk or home video game console. The console may be capable of working with multiple types of edible inflatable objects 12 to create different shows/interactive experiences. The edible inflatable object 12 is connected to the console (possibly by placing it on the top surface). This connection may include any actuation connections, sensors, or show effects that are coupled to the edible inflatable object 12 to function. The console may automatically detect a type of edible inflatable object 12 connected, where the connection points are, and how many pieces of edible inflatable object 12 are attached. Alternatively, the user may provide some or all of this information manually. Once the edible inflatable object 12 has been connected, the console is able to execute a show/interactive experience compatible with the edible inflatable object 12 that has been connected. Multiple pieces of edible inflatable object 12 may be connected to the console at the same time, allowing the pieces of edible inflatable object 12 to interact with each other during the experience. Show effects such as lighting, sounds, and/or video may be incorporated into the console to enhance the experiences. In the illustrated embodiment of FIG. 7A, the console may receive a first type of edible inflatable object 12, and may activate a first animation pattern to cause the first type of edible inflatable object 12 to achieve a first configuration 114 based on the detected type, as well as any associated media displayed on the display 120. The console may also receive a different second type of edible inflatable object 12, as shown in FIG. 7B, and may activate a second animation pattern to cause the second type of edible inflatable object 12 to achieve a second configuration 118 based on the detected type, as well as any associated media displayed on the display 120. The animation is aligned to the object type such that the fill or inflation levels of the internal compartments 112 of the respective object types and/or the flow rate through the fluid conduits 110 are selected to achieve the desired configuration or configurations associated with each animation.

In a theme park context the console may be implemented as a kiosk station (e.g., kiosk 28, see FIG. 1) located within the park. Guests purchase a piece of edible inflatable object 12 or a set from a store and bring them to each kiosk, connect them to the kiosk, experience a unique show/interactive based on the kiosk location, the type of edible inflatable object 12 attached, and/or guest profile information (which may be provided from a mobile device operating a dedicated application), such as what other stations the guest has visited.

In a home context the console style may take a form similar to a home video game console. Guests may purchase experiences in the form of pieces or sets of edible inflatable object 12. They may do this online, in stores, or exclusively from a theme park, where the edible inflatable object 12 may have also been activated in one or more experience. After bringing their edible inflatable object 12 home, the guests may attach the edible inflatable object 12 to the console to activate it and start a compatible experience.

Figure 8:
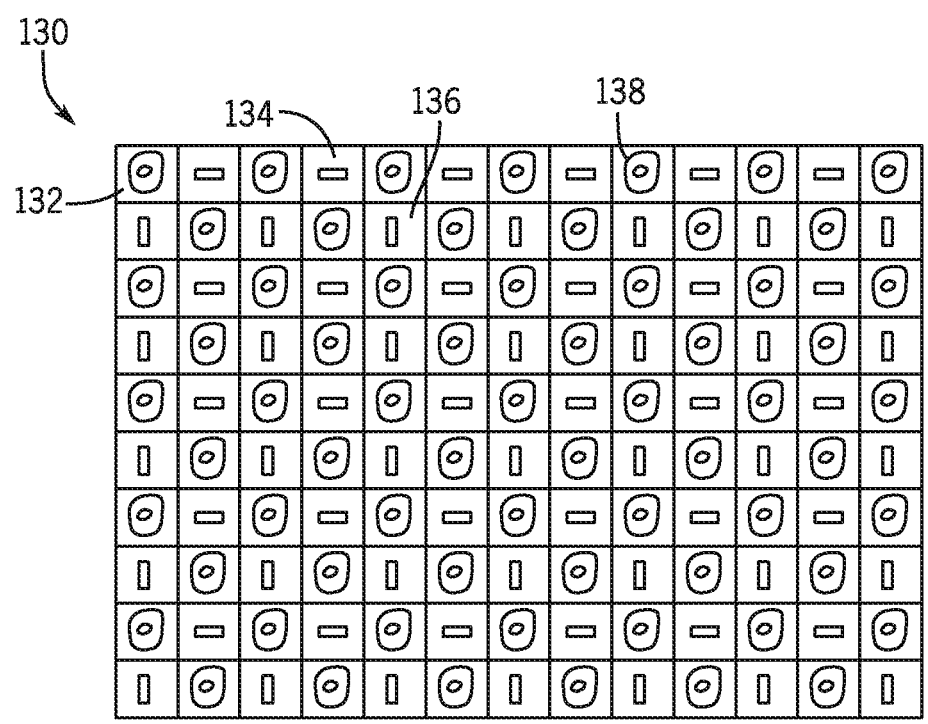
FIG. 8 is a schematic illustration of an interactive surface that may be used in conjunction with an edible soft robot system, in accordance with embodiments described herein.

FIG. 8 is a schematic illustration of an interactive surface 130 that may be part of the edible soft robot system 30 that is part of an interactive experience or exhibit. The surface 130 is covered with an array of different types of connectors and effects including air flow input/output conduits 138, electrical contacts 136, lights 134, and may include other show effects and sensors. These elements are arrayed such that an individual edible inflatable object 12 may be placed at any location on the surface 130 and will directly touch at least a minimum number of connections for the edible inflatable object 12 to operate. In an embodiment, the minimum connection between the interactive surface 130 and the edible inflatable object 12 is achieved when the edible inflatable object 12 is directly touching at least one array element, at least two array elements, or at least three array elements. The interactive surface 130 may be arranged such that certain adjacent elements are different from one another to promote combined actuation/special effects when the edible inflatable object 12 is touching multiple elements. Once the edible inflatable object 12 has been activated, the array may move air within and/or around the edible inflatable object 12 to move the edible inflatable object 12 (or cause the edible inflatable object 12 to move itself) from one array of the surface 130 to another. As the edible inflatable object 12 moves the connections it is attached to will change. The control systems may only activate the elements that are detected to be in proximity to, or touching the edible inflatable object 12. Multiple pieces of edible inflatable object 12 may be placed on the surface 130 at the same time and controlled separately. The surface 130 may incorporate show effects, sensing systems, and interactivity. The surface 130 may also be used as a component of the other presentation arrangements as disclosed herein. An advantage of the surface 130 is that the design of the control system is more flexible and thus may be compatible with multiple types of edible inflatable object 12. Additionally, the surface 130 allows for multiple edible inflatable object 12 pieces to move around on a surface without a tether or a predefined path. The surface 130 allows for placement without complex coupling to the control system 32 or alignment steps. That is, the surface 130 may be self-aligning with the edible inflatable object 12 to permit coupling to the control system 32. To facilitate such flexible positioning, the edible inflatable objects 12 may be implemented with tapering valves that are relatively larger at an exterior surface of the edible inflatable object 12 and that narrow into the internal compartment 112. The surface 130 may be part of an interactive exhibit or game (e.g., interactive exhibit 26, see FIG. 1) to permit users to move their pieces along the surface.

Figure 9:
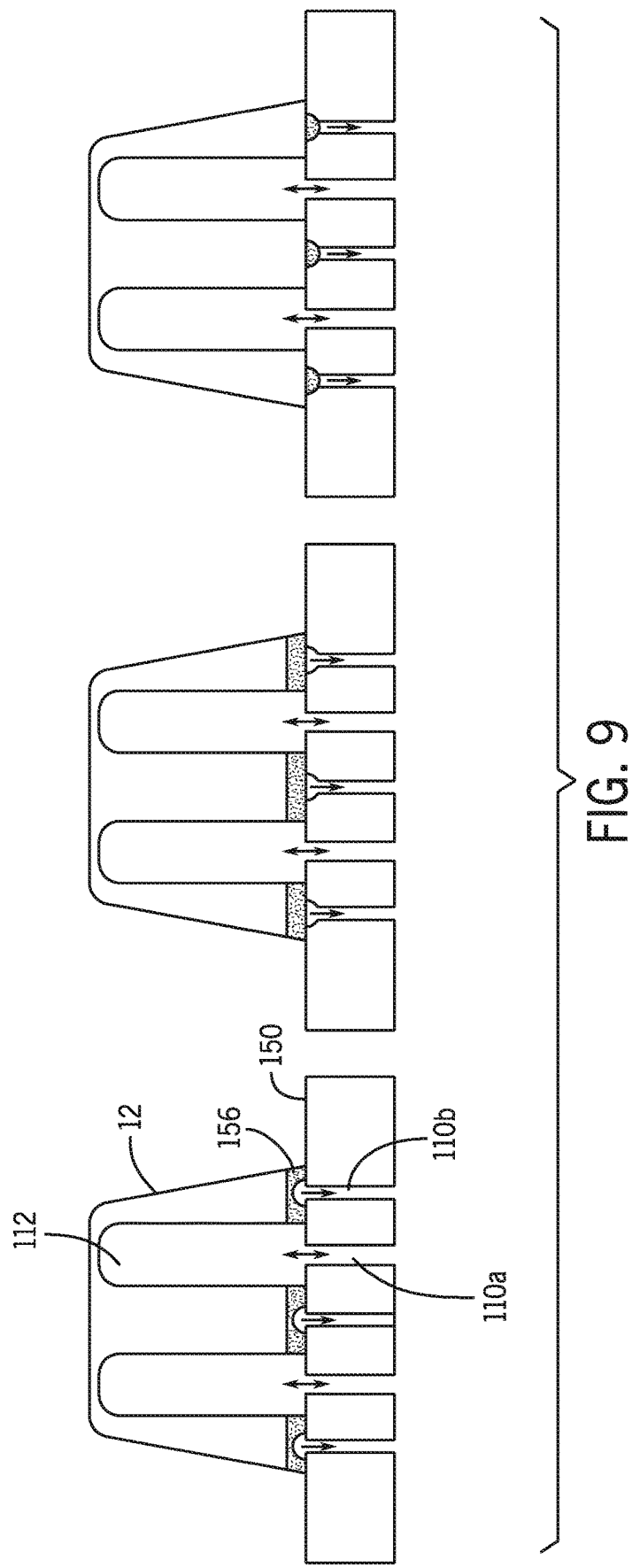
FIG. 9 is a schematic illustration of an edible soft robot including a conformable gasket that may be used in conjunction an edible soft robot system, in accordance with embodiments described herein.

FIG. 9 shows a cross-section of an implementation of the edible inflatable object 12 that forms an improved seal with contact surfaces (e.g., as in FIGS. 4-5, 7) that facilitate coupling to the control system 32. The depicted contact surface 150 may include a plurality of through passageways that accommodate respective fluid conduits 110. An integral gasket 156 of the edible inflatable object 12 is positioned about an internal compartment 112 that receives fluid from and vents via a fluid conduit 110a. The gasket 156 may include a groove or depression that aligns with a fluid conduit 110b. The gasket enhances sealing by being drawn down when the fluid conduit 110b draws a vacuum. This may be in concert with inflation and/or deflation of the internal compartment 112 via the fluid conduit 110a.

The surface 150 may also include heating elements that melt the gasket 156 into the surface 150 to enhance the seal. The seal may be broken upon removal of the edible inflatable object 12 for consumption. The gasket may be formed from a different (e.g., stiffer) material that the other portions of the edible inflatable object 12, or may be differently processed (e.g., cross-linking) to enhance sealing properties.

Figure 10:
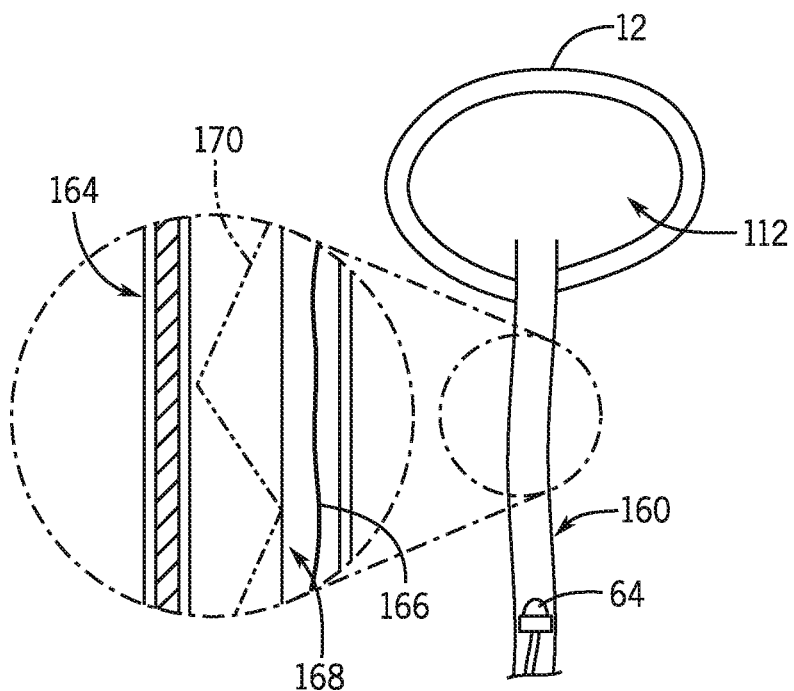
FIG. 10 is a schematic illustration of a tether that may be used to activate an edible inflatable object in conjunction with an edible soft robot system, in accordance with embodiments described herein.

FIG. 10 is a schematic illustration of a cross-section and detail view of a tether 160 that couples to the edible inflatable object 12 and that facilitates fluid flow and show effects. The tether 160 couples the edible inflatable object 12 to the control system 32, which is located out of view of the guest, for example behind a counter or wall, or in a cabinet. The tether 160 may couple to the edible inflatable object 12 via mechanical methods (such as a barb) or via another method such as vacuumed seal(s), chemical bond, food safe adhesive, or a sticky nature of the edible inflatable object 12. The tether 160 may include one or more fluid conduits 110 within a housing 164 for moving air (or other fluids) to and from the internal compartment 112 of the edible inflatable object 12 to actuate the edible inflatable object 12. Lighting effects may be generated by way of a light source 64 in a tip of the tether 160 or a light source 64 at a base of the tether 160 whose light 170 is internally reflected using reflective material 168 along the length of the tether and thus illuminating the edible inflatable object 12. The tether 160 may also provide electrical connections and sensing (e.g., via sensing wires 166) from the control system 32 to the edible inflatable object 12 and back. These connections may be used to power electrical components for show effects inside the edible inflatable object 12 as well as for sensing. Once the show/interactive experience is over the edible inflatable object 12 may be removed from the tether 160 and eaten. The tether 160 may be detachable from the control system 32. The tethers 160 may be washable or disposable. The tether 160 may be attached to the edible inflatable object 12 during manufacturing, when the edible inflatable object 12 is placed on display in the shop, when the edible inflatable object 12 is purchased, or when the edible inflatable object 12 is ready to be used (e.g., animated).

Figure 11:
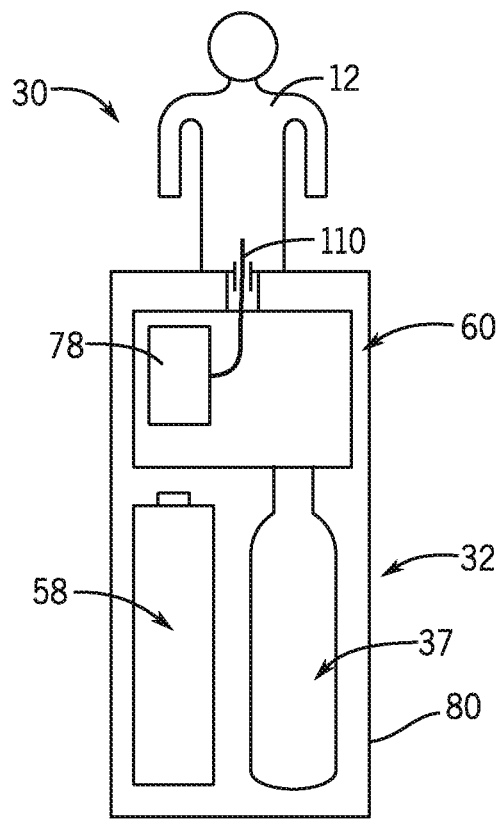
FIG. 11 is a schematic illustration of an edible soft robot system integrated into a food container, in accordance with embodiments described herein.

FIG. 11 is a schematic illustration of a cross-section of an edible soft robot system 30 implemented as part of a food container, e.g., an ice cream cone style container. For example, the control system 32 and/or the special effect control system 60, and associated components, such as the power supply 58, the fluid source 37 are located in the container 80. The container 80 is not edible and is configured as a hand held device similar in shape and size to an ice cream cone. The edible inflatable object 12 is attached to the top of the cone and coupled to the container 80 via a fluid conduit 110. This attachment allows the control systems to actuate the edible inflatable object 12 as well as other effects. Sensor/s 78 are located in the cone and extend within the edible inflatable object 12 to allow the control system 32, including the effect control system 60, to detect how and/or when the guest is interacting with the edible inflatable object 12 and the cone. The control system 32 may generate instructions to actuate the edible inflatable object 12 in response to sensed actions such as licking and biting the edible inflatable object 12. This creates an interactive experience while the edible inflatable object 12 is being eaten. In an embodiment, sensed contact may cause deflation from a default inflated state such that the edible inflatable object 12 moves away from the user during an eating attempt. Accordingly, the guest eats the edible inflatable object 12 while it is still connected to the control system 32.

Figure 12:
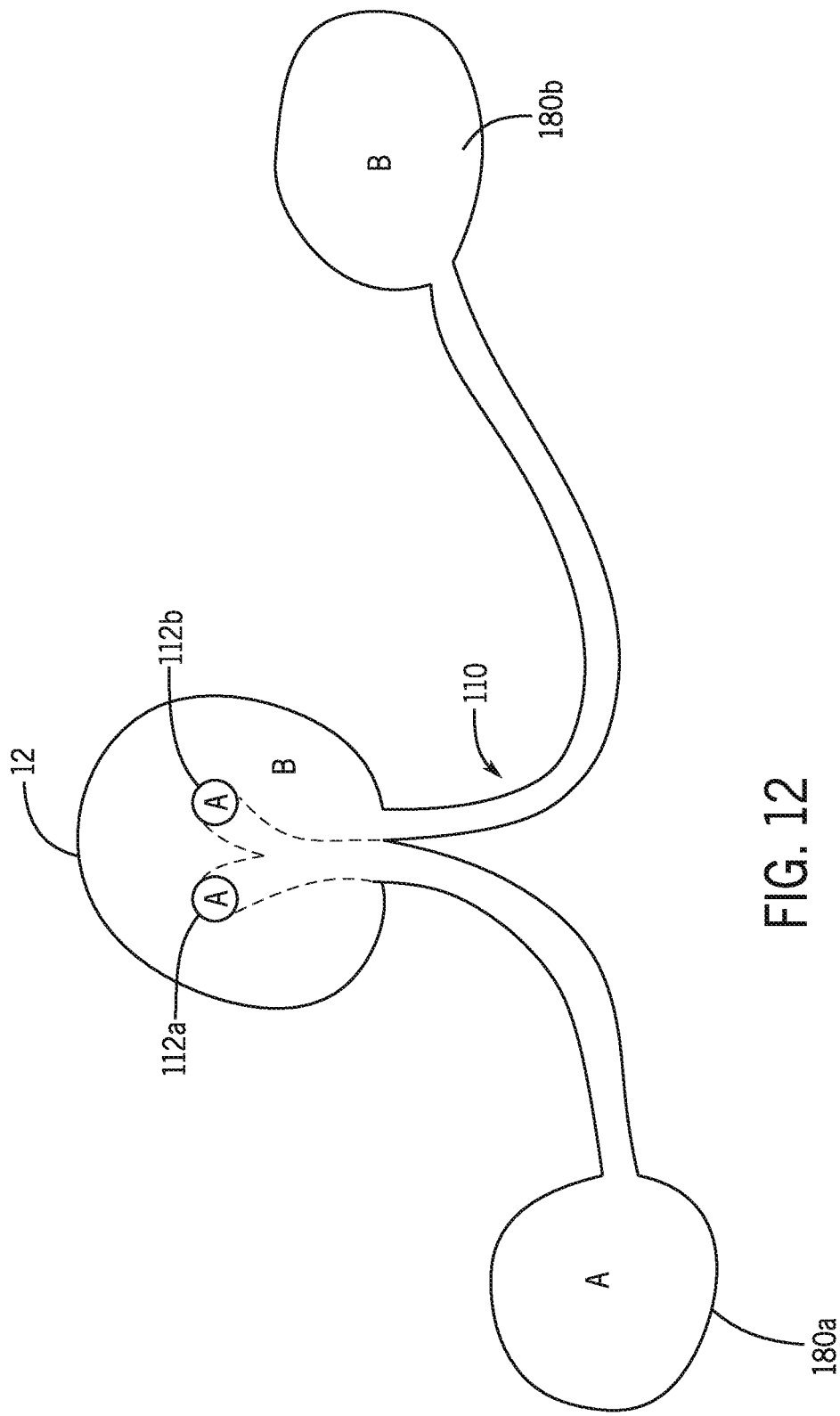
FIG. 12 is a schematic illustration of a closed volume arrangement of an edible soft robot system, in accordance with embodiments described herein.

FIG. 12 is a schematic illustration of an edible soft robot system implemented using a sealed fluid volume transfer. That is, additionally or alternatively to embodiments in which fluid flows into and out of the edible inflatable object 12 via air pumps, valves, or pressurized air tanks, the edible inflatable object 12 may also include one or more coupled bladders 180 that may be manually compressed and/or released by a user. When the control bladders 180 are compressed, the edible inflatable object 12 inflates. Conversely, fluid may be pushed from the edible inflatable object 12 back into the control bladder/s 180. The control bladders 180 may formed from the material of the edible inflatable object 12 or may be non-edible. The control bladders 180 may be compressed/stretched by the user, a puppeteer, or an arm of a robotic system. The control bladders 180 may be attached to the edible inflatable object 12 via fluid conduits 110 during manufacturing, when the edible inflatable object 12 is placed on display, when the edible inflatable object 12 is purchased, or when the edible inflatable object 12 is ready to be used (e.g., animated). In the depicted embodiment, separate control bladders 180a, 180b may control different actuatable elements of the edible inflatable object 12. For example, the control bladder 180a is coupled to an internal compartment 112a corresponding to the creature eyes (e.g., to cause bulging when inflated) while the control bladder 180b is coupled to an internal compartment 112b corresponding to the creature body.

Figure 13:
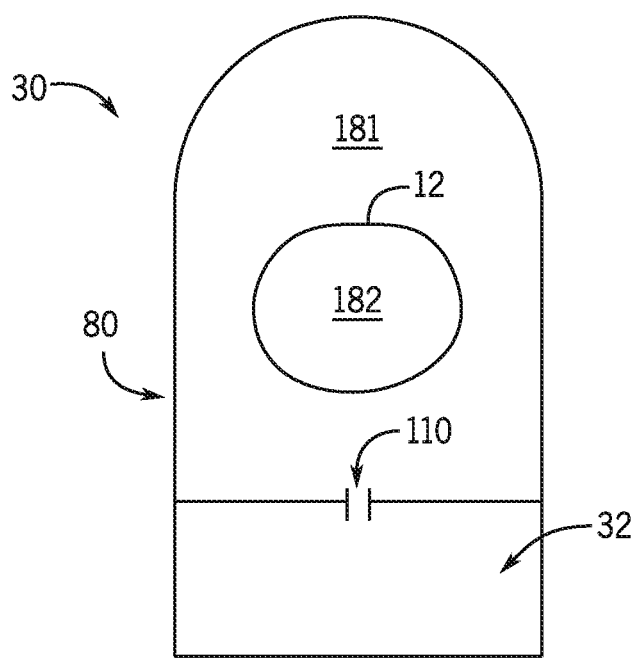
FIG. 13 is a schematic illustration of a vacuum chamber arrangement of an edible soft robot system, in accordance with embodiments described herein.

FIG. 13 is a schematic illustration of the edible soft robot system 30 incorporated into a container 80 configured as a vacuum chamber. The chamber is capable of both positive and negative pressure. Here, the edible inflatable object 12 may not include any holes or valves to permit access to the internal compartments of edible inflatable object 12. Instead, when the pressure in an interior space 181 in the chamber changes, the edible inflatable object 12 expands or contracts because of the difference in pressure between the internal compartment 182 of the edible inflatable object 12 and the interior space 181 of the container 80 that surrounds the edible inflatable object 12. A benefit of the depicted embodiment is that the edible inflatable object 12 is not attached or coupled to external structures, e.g., the vacuum chamber may be used in implementations in which free roaming of the edible inflatable object 12 is desirable. In the depicted embodiment, the pressure in the interior space 181 may be adjusted by the control system 32, which may add or remove fluid via the conduit 110 coupled to the interior space 181.

Further, the edible inflatable object 12 may have a certain amount of energy stored within that permits the visible actuation within the chamber while the internal compartment 182 is sealed. Eventual loosening of elasticity of the edible inflatable object 12 or degradation of the seal to the internal compartment 182 over time, may decrease the visible actuation effects. However, the edible inflatable object 12 may also have a one-way valve that permits the internal compartment to be manually refilled with fluid such that the container can be used in conjunction with the edible inflatable object 12 multiple times. In another embodiment, a user may purchase new edible inflatable objects 12 for use with the container 80.

Figure 14:
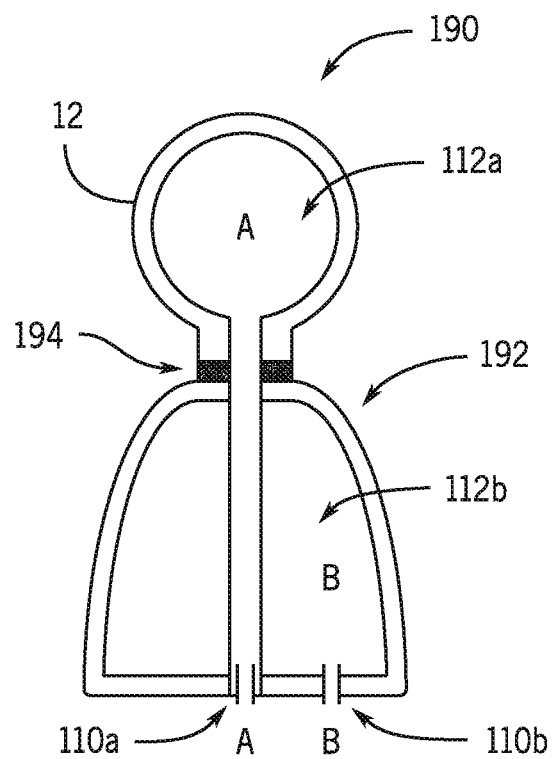
FIG. 14 is a schematic illustration of components of a customizable edible soft robot that may be used in conjunction with an edible soft robot system, in accordance with embodiments described herein.

FIG. 14 is a schematic illustration showing a cross-section of a customizable implementation of the edible inflatable object 12 in which guests are able to provide user input to the control system 32 to make selections about the appearance and/or flavor profile of the custom edible inflatable object 12. In an embodiment, based on the input, a custom mold is made on demand (e.g. 3D printing) or existing modular molds are customized and combined. The edible inflatable object 12 is poured into the molds and allowed to set, and the guest is given the edible inflatable object 12 when ready. In one embodiment, the modular pieces 190, 192 of edible inflatable object 12 are pre-made and bonded to each other using an edible adhesive or bonding layer and selected based on guest input. This has the advantage of minimizing the time from guest creation to the edible inflatable object 12 being finished. In the depicted embodiment, each modular piece 190, 192 has a respective internal compartment 112a, 112b. When the first modular piece 190 is adhered to the second modular piece 192, the first internal compartment is fluidically accessible via the fluid conduit 110a and sealed from or separated from the second internal compartment 112b, which is fluidically accessible via the fluid conduit 110b. Accordingly, the modular pieces may include pieces that, when coupled, are aligned to permit desired access by the fluid control system 34 via coupled fluid conduits 110. In another embodiment, the edible inflatable object 12 itself may be 3D printed on demand. Customization options may include color, flavor, filling, surface texture, decorative shape, mechanical shape (which influences how the edible inflatable object 12 moves when actuated), internal compartment filling, and/or customized content such as name imprint on a surface.

Figure 15:
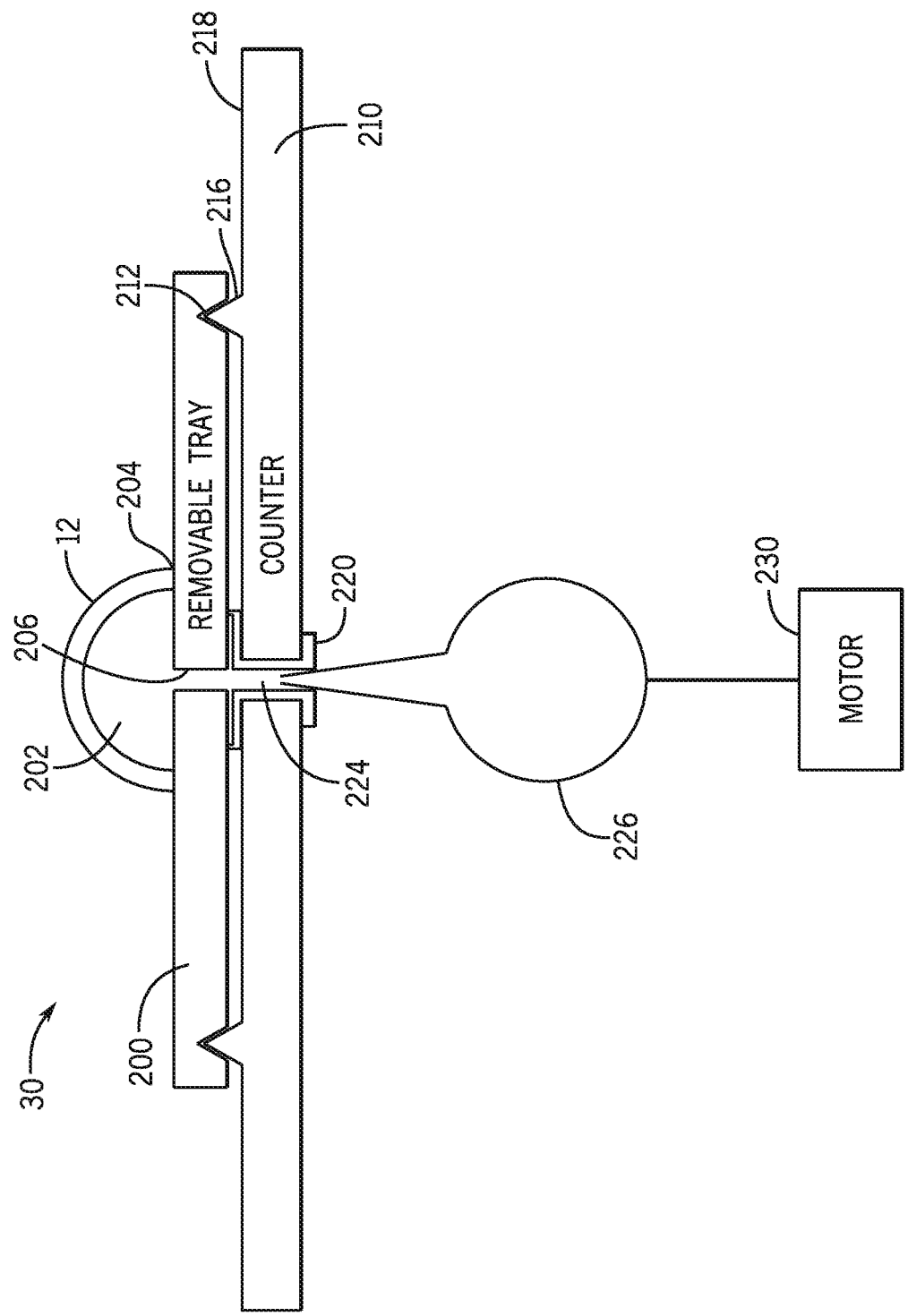
FIG. 15 is a schematic illustration of a tray arrangement of an edible soft robot system, in accordance with embodiments described herein.

FIG. 15 is a schematic illustration of a cross-section of an arrangement of the edible soft robot system 30 that incorporates a tray 200 and that may be suitable for a retail or restaurant display. The tray 200 facilitates rapid replacing of candies on a countertop, as is generally involved in food service and sale applications on a large quantity scale.

In the depicted arrangement, the tray 200 may be removable to quickly replenish a supply of edible inflatable objects 12 on a replacement tray 200. The tray 200 may be configured to hold the edible inflatable object/s 12 while also aligning with more complex components of a cart or table to facilitate fluid delivery to the edible inflatable object 12 through the tray. The tray 200 may serve as an interface to various ports or openings in fluid delivery systems while also isolating the edible inflatable objects 12 from fluid delivery machinery that is reused over time and with various trays 200. In this manner, the edible inflatable objects 12 may remain generally fresh and separated from the machinery, and the more costly fluid delivery systems are also not spoiled by contact with the edible inflatable objects 12. While the illustrated example shows a single edible inflatable object 12, it should be understood that the system 30 may include multiple edible inflatable objects 12 on the tray 200.

A port or recess 202 (e.g., a dome-shaped portion) of the edible inflatable object 12 is positioned on a top surface 204 of the tray 200 and covering a through passage 206 of the tray 200. As shown, the recess 202 is coupled to the top surface 204 to at least partially seal around the through passage 206. The tray 200 is removably coupled to a counter 210, which may be part of a display arrangement, table, or moving cart (e.g., a buffet cart). The illustrated arrangement may include various fluid delivery, power, and control components as disclosed herein that are generally located out of sight of the user beneath the counter 210. In this manner, the servers may remove and replace the trays 200 without the machinery being visible to the user during the replacement step.

Further, to assist with rapid replacement of the trays 200 on the counter 210, the tray 200 and the counter 210 may have complementary mating features to facilitate alignment of the tray 200 with the counter 210. By way of example, the tray 200 may include a recess 212 that reversibly mates with a protrusion 216 extending from a counter surface 218. The alignment of the tray 200 with the counter 210 aligns the through passage 206 with a grommet 220 coupled to the counter 210 and extending through an aperture in the counter 210. A grommet passage 224 is fluidically coupled to a fluid source 226. In the depicted example, the fluid source 226 is a bladder or dropper-type assembly. However, other arrangements as disclosed herein are also contemplated. As discussed, various components of the system 30 are positioned under the counter 210, including a motor 230 that operates to cause fluid to flow from the fluid source 226 to the recess 202. The grommet 220 seals the tray 200 to align the through passage 206 and the grommet passage 224 such that the recess 202 of the edible inflatable object 12 and the fluid source 226 are fluidically coupled. The through passage 206 and the grommet passage 224 may have approximately a same inner diameter. In an embodiment, the grommet passage 224 may have a larger inner diameter than the through passage 206.

When the tray 200 is mated to the counter 210 via the mating features, the grommet 220 generally acts to fluidically couple the edible inflatable object 12 and the fluid source 226. The disclosed arrangement operates such that aligning trays 200 on the counter 210 aligns the various through passages 206 and the grommet passages 224 to seals the airflow path for edible inflatable objects 12. Further, removal of an individual edible inflatable object 12 from the tray 200 does not affect the seals of remaining edible inflatable objects 12 on the tray 200, because respective grommets 220 retain the seals for those remaining edible inflatable objects 12. The edible inflatable objects 12 may sealed to the removable tray using molten candy or other food-safe adhesive while the tray 200 is separate from the counter 210, allowing for refilling the tray with candy while away from the air delivery system.

Figure 16:
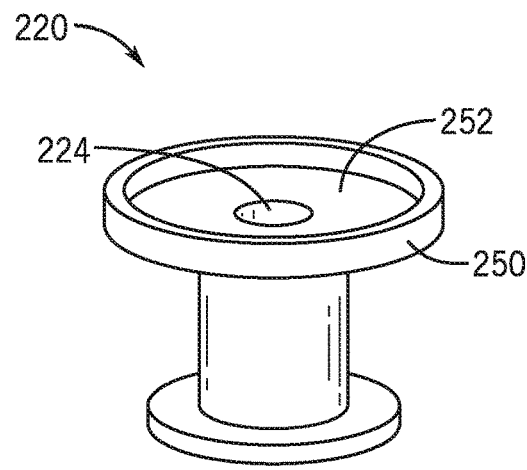
FIG. 16 is a perspective view of a grommet that may be used in conjunction with embodiments described herein.

In an embodiment, the trays 200 may be part of a moving conveyor belt to move edible inflatable objects 12 into position relative to a fluid delivery system. The conveyor may be controlled to stop in correctly aligned positions relative to the fluid delivery system. Further, the grommets 220 may be shaped (e.g., elongated) to create a seal along the direction of motion, allowing the edible inflatable objects 12 to actuate while the conveyor is moving FIG. 16 shows a perspective view of the grommet 220. The grommet 220 may be configured to include a flange 250 defining a sealing portion 252 that is wider than the grommet passage 224 and the through passage 206 to permit certain tolerance in alignment of the tray 200 and the counter 210. That is, the flange 250 and the sealing portion 252 expands the diameter of the sealed air channel of the grommet passage 224 and the through passage 20, allowing the placement of the removable tray 200 to be imprecise, which improves speed of placing the tray on the counter 210. The grommet 220 may be formed from rubber, silicone, etc., and is designed to fill a corresponding passage in the counter 210 and raise the airflow path above the counter 210, such that the removable tray 200 can rest evenly on the grommets 220 and provide an airflow seal to all edible inflatable objects 12 on the tray 200. The grommet 220 and/or the counter 210 may be clear or partially translucent to allow lighting systems to pass light through to the edible inflatable objects 12.

Figure 17:
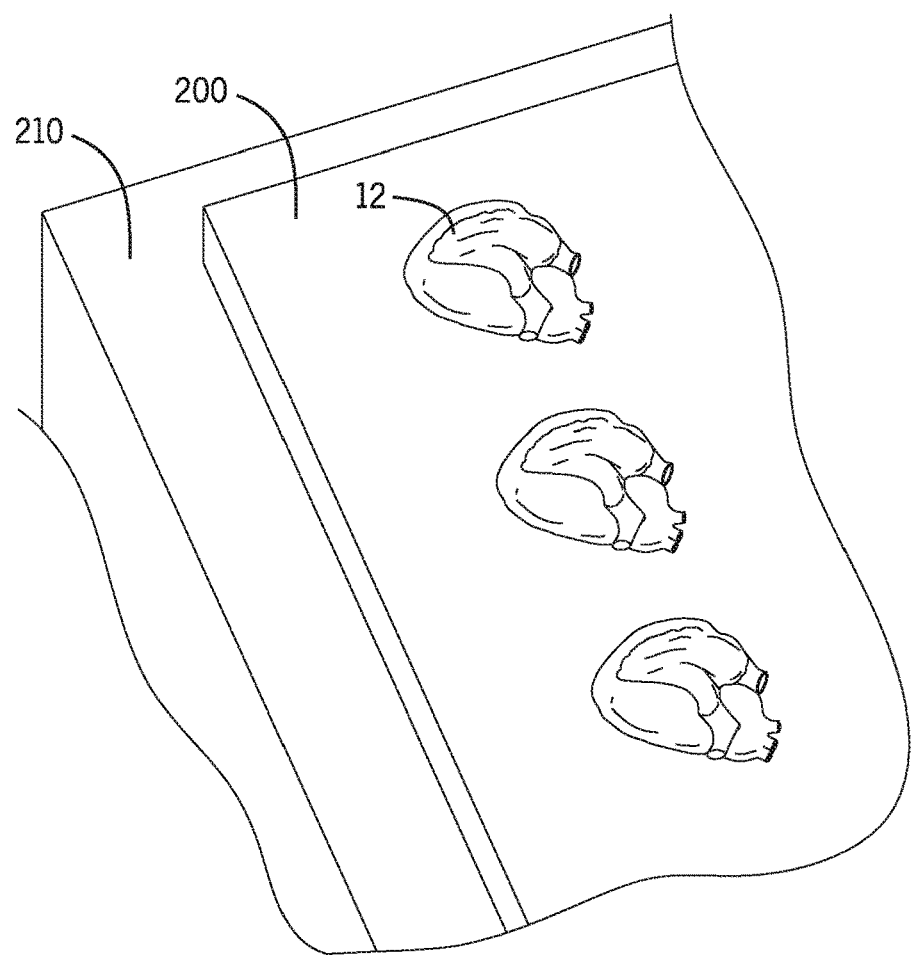
FIG. 17 is an image of edible inflatable objects in a tray arrangement.

FIG. 17 shows a perspective view of example edible inflatable objects 12 implemented as anatomically-realistic hearts and arranged on the tray 200, which in turn is coupled to the counter 210, e.g., as shown in FIG. 15. It should be understood that the configuration of the edible inflatable objects 12 is by way of example, and any suitable configuration may be used.

Figure 18:
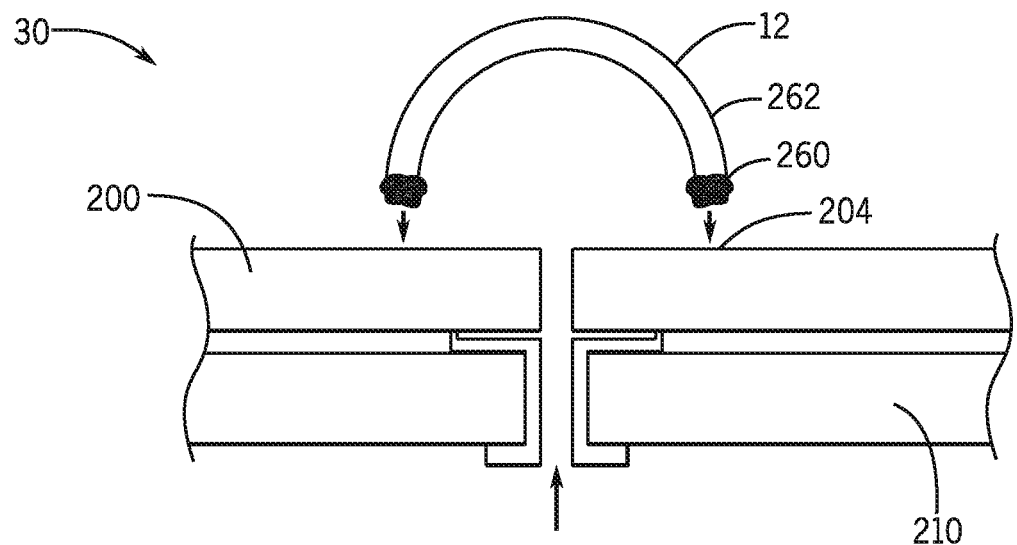
FIG. 18 is a schematic illustration of an arrangement of an edible soft robot system, including an adhesive, in accordance with embodiments described herein.

FIG. 18 depicts an embodiment, shown in cross-section, in which the edible inflatable object 12 is dip coated in an edible adhesive 260 on a surface 262 of the edible inflatable object 12 that seals or adheres the edible inflatable objects 12 to the top surface 204 of the tray 200. As discussed, the tray-based system 200 may prevent the edible adhesive from contacting the counter 210. In another example, the edible adhesive 260 may be applied directly to the top surface 204 of the tray 200, and the edible inflatable objects 12 may be positioned on the adhesive 260. The edible adhesive may be a molten candy that hardens over time. In another example, the edible adhesive 260 may be a slime or viscous outer layer of the edible inflatable object 12. The edible adhesive 260 may have different flow properties that an interior or inner layer of the edible inflatable object 12 that is relatively more solid.

Figure 19:
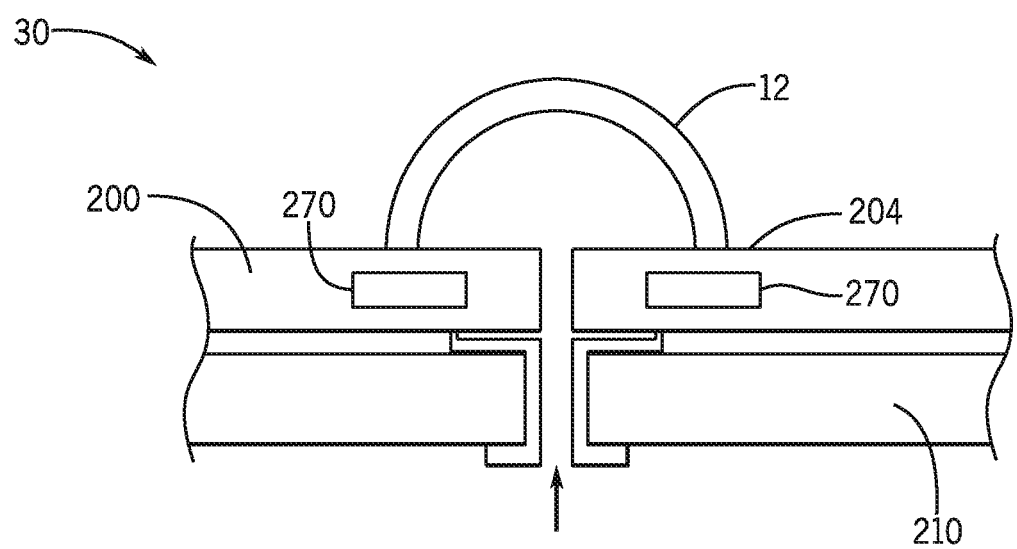
FIG. 19 is a schematic illustration of an arrangement of an edible soft robot system, including an internal heating element, in accordance with embodiments described herein.

The seal of the edible inflatable object 12 may also be influenced by temperature. FIG. 19 depicts an embodiment, shown in cross-section, in which the tray 200 includes integral heating elements 270. Heating the portion of the edible inflatable object 12 in direct contact with the top surface of the tray 200 may result in softening that enhances the seal to the tray 200. Controlling the heating elements 270 to cease operation prior to user contact may permit the edible inflatable object 12 to cool for easier removal from the tray 200. In certain embodiments, the heating elements 270 may be on or in the counter 210, and the heat may be transferred through the tray 200.

Figure 20:
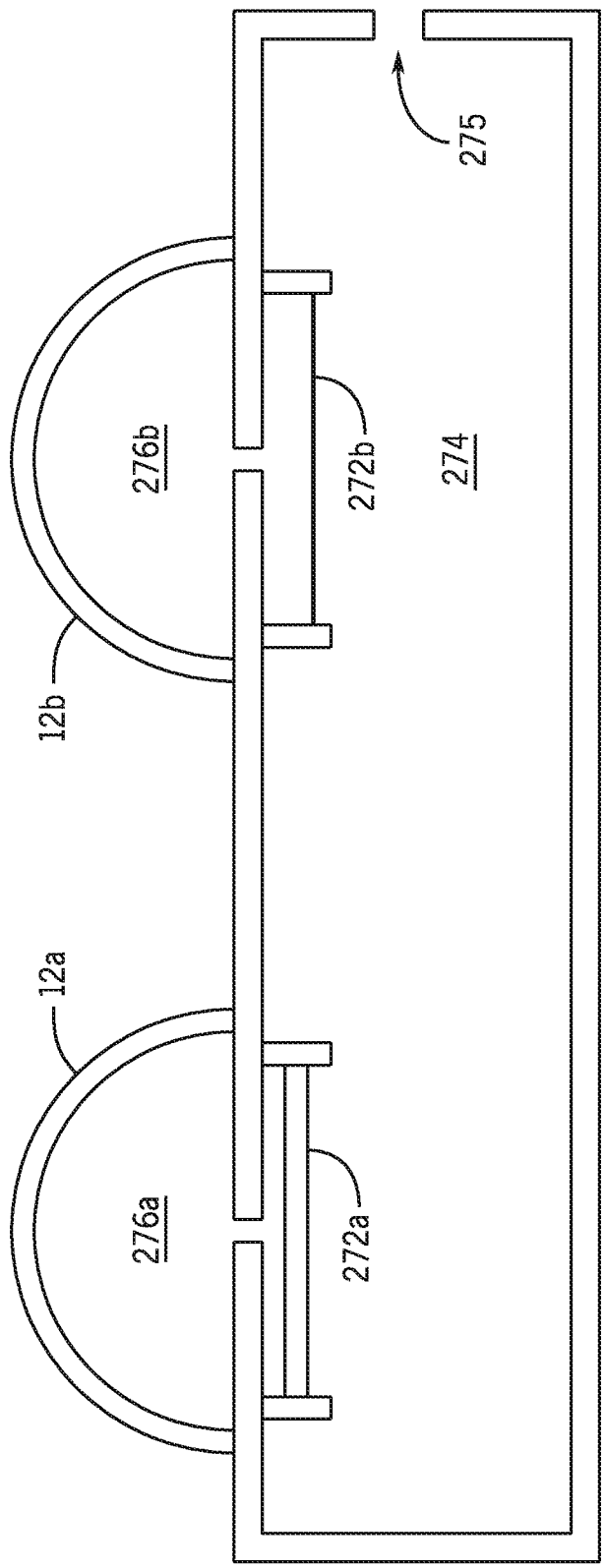
FIG. 20 is a schematic illustration of an arrangement of an edible soft robot system, including a flexible membrane, in accordance with embodiments described herein.

FIG. 20 illustrates an embodiment, shown in cross-section, in which a single fluid source may be used to drive one or more edible inflatable objects using deformation of a flexible membrane 272. The flexible membrane separates a reservoir 274 from a sealed interior space 276 of the edible inflatable object 12. In the illustrated embodiment, the edible inflatable objects 12a, 12b are separated from the fluid reservoir 274 by individual deformable membranes 272a, 272b. Each individual flexible membrane 272 may have differing stiffness and/or size such that changes in pressure within the fluid reservoir 274 cause different deformations for a thicker membrane 272a relative to a thinner membrane 272b. The size and characteristics of the deformation in turn cause visible actuations in the respective edible inflatable objects 12a, 12b. The edible inflatable objects 12a coupled to the thicker membrane 272a may have an actuation that is visibly smaller or less extensive than that of the edible inflatable objects 12b coupled to the thinner membrane 272b based on deformations caused by a single pressure source that feeds the fluid reservoir 274. The fluid reservoir may be coupled to an inlet 277 that permits changes in pressure to cause resulting changes in actuation of the edible inflatable objects 12. In this manner, a controller may cause a change in pressure within one chamber, the fluid reservoir 272, and achieve multiple different types or grades of effects on the edible inflatable objects 12 relative to one another, based on their corresponding flexible membrane characteristics. Further, the changes may be mediated by a single non-food safe pressure source (positive or negative). That is, because the membranes 272 separate the fluid reservoir 274 from the edible inflatable objects 12, the fluid source need not necessarily be food safe.

The fluid or pressure source may be a vacuum pump, an air compressor, another membrane that is mechanically actuated, or any other suitable device for generating changes in pressure. The disclosed arrangement may be used in conjunction with other pressure sources to gain more control over the individual edible inflatable objects 12. In an embodiment, separate fluid reservoirs, coupled to separate individual or multiple edible inflatable objects 12, may be tuned to achieve desired effects.

Figure 21:
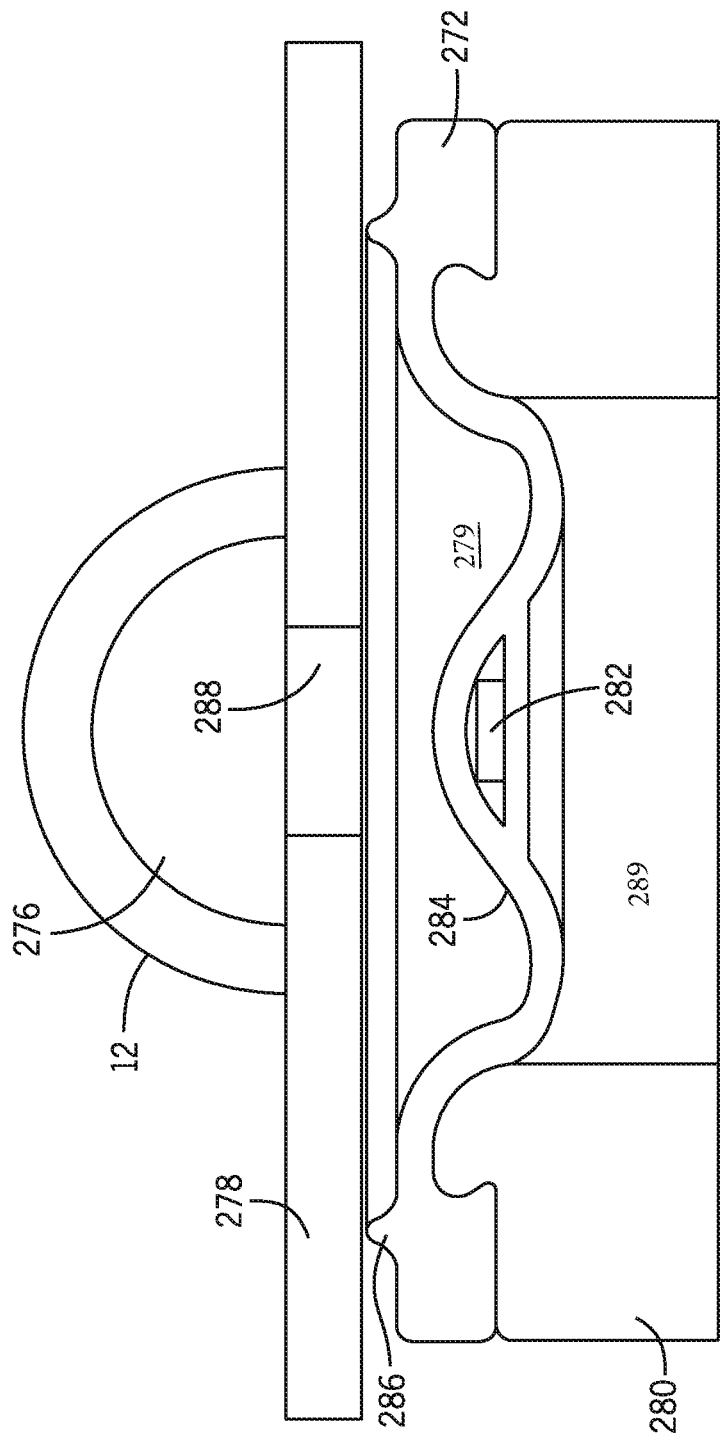
FIG. 21 is a schematic illustration of an arrangement of an edible soft robot system, including a flexible membrane, in accordance with embodiments described herein.

FIG. 21 shows, in cross-section, an arrangement of the flexible membrane 272. The flexible membrane is coupled to a magnet 282 (e.g., an electromagnet) that, in response to experience a magnetic field or a change in magnetic field forces, moves to actuate the flexible membrane 272. The magnet 282 may be contained within an integral pouch formed in the flexible membrane or may be adhered to or embedded within the flexible membrane 272. The flexible membrane 272 includes an elastic, folded, shaped, rippled, textured, and/or volume-holding flexible surface 284 that is part of or couples to a sealing grommet 286. The sealing grommet 286 seals a tray 278 that holds edible inflatable object 12 to a base 280. The tray 278 has a fluid port 288 that fluidically couples air or fluid in an area 279 above the flexible membrane 272 to the chamber 276 within the edible inflatable object 12. The sealing grommet 286 functions to seal the fluid within the area 279 and the chamber 286 from air infiltration or exfiltration.

Movement of the flexible membrane 272 relative to the fluid port 288 or the tray 278 changes a pressure of the chamber 276, either by compressing or permitting expansion of the internal fluid, which in turn causes the edible inflatable object 12 to actuate. The base 280 also includes a passageway 289 into which the flexible membrane 272 can expand to cause the overall total volume of the area 279 to expand, resulting in a drop in pressure of the chamber 276 and a deflation effect of the edible inflatable object 12. Movement of the flexible membrane 272 into the fluid port 288 causes the overall total volume of the area 279 to decrease, resulting in an increase in pressure of the chamber 276 and an inflation effect of the edible inflatable object 12. Changes in magnetic forces may be used to provide motive force to the flexible membrane 272 by acting on the magnet 282 via attraction or repulsion forces that causes movement into the tray fluid port 288 or into the base passageway 289 depending on the activation and polarity of the magnetic field. In one example the activation of the magnetic field is controlled via a controller of the system 30.

Figure 22:
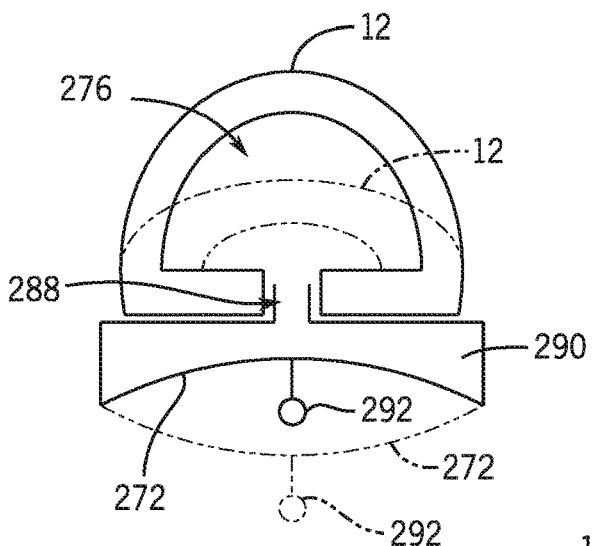
FIG. 22 is a schematic illustration of an arrangement of an edible soft robot system, including a flexible membrane, in accordance with embodiments described herein.

As disclosed herein, movement of flexible membrane 272 may be via application of magnetic forces. Additionally or alternatively, the membrane 272 may be user actuated to cause movement effects in the edible inflatable object 12. FIG. 22 shows, in cross-section, an example of the edible inflatable object 12 that is actuated via user (or motor-driven) movement of a handle 292 coupled to the membrane 272. In an embodiment, the user is able to pull and push on the flexible membrane 272, which is built into the box or packaging of the edible inflatable object 12 and, as shown, integrated into an object base 290 that holds a volume of fluid coupled via fluid port 288 to the chamber of the edible inflatable object 12. The movement of this membrane 272 causes a positive or negative pressure differential to occur between the inside and the outside of the edible inflatable object 12, and in turn causes motion to happen. As shown in FIG. 22, pulling the membrane 272 away from the edible inflatable object 12 causes a deflation effect due to the pressure drop within the edible inflatable object 12. A snapped-back or unbiased default position may be the inflated configuration of the edible inflatable object 12.

Figure 23:
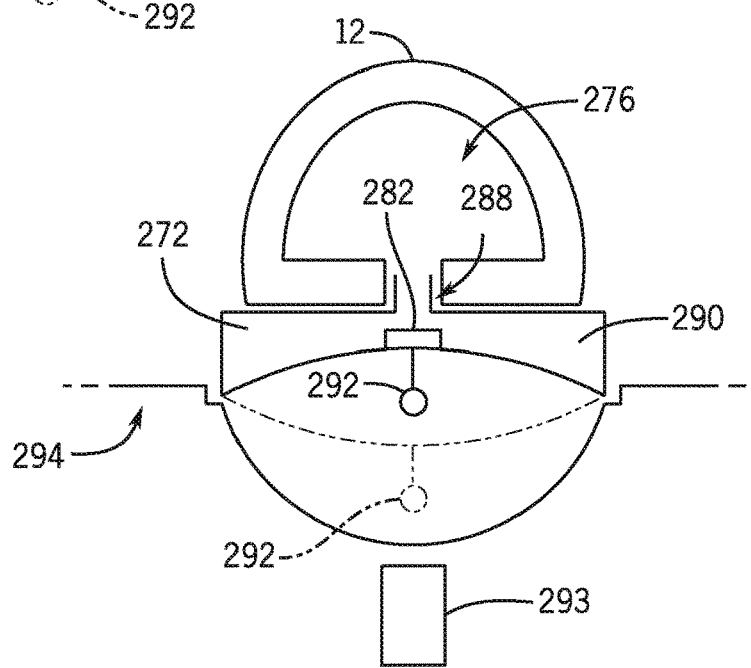
FIG. 23 is a schematic illustration of an arrangement of an edible soft robot system, including a flexible membrane, in accordance with embodiments described herein.

FIG. 23 is an arrangement, shown in cross-section, in which a magnetic material 293 is integrated into the object base 290 and/or flexible membrane 272 and used to pull or push the membrane 272. In this embodiment the membrane 272 would have a magnet or ferrous metal inside it, embedded within the membrane, or integrated as a layer of the membrane 272. The magnetic material would be pulled by the electromagnet 282 and thus generate a pressure differential between the edible inflatable object 12 and the ambient environment. The counter 294 or other display surface could have an inset in it to allow the membrane to pull toward the electromagnet and to align it to the counter. In the depicted embodiment, the membrane 272 is shown in alternative configurations. The configuration of the membrane 272 closer to the electromagnet 282 is associated with a relatively deflated configuration of the edible inflatable object 12 (not shown), and the configuration relatively farther from the electromagnet 282 is associated with the more expanded configuration of the edible inflatable object 12 as shown. The electromagnet may be activated by a controller of the system 30. Further, the membrane may additionally include the handle 292 for manual actuation.

Figure 24:
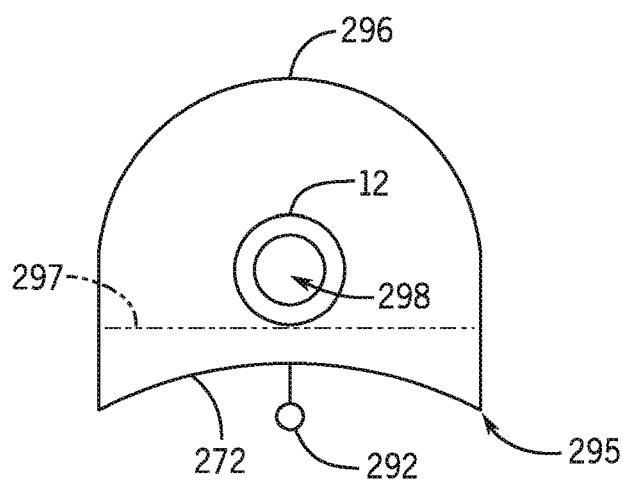
FIG. 24 is a schematic illustration of an arrangement of an edible soft robot system, including a flexible membrane, in accordance with embodiments described herein.

FIG. 24 is an arrangement, shown in cross-section, in which movement of the membrane 272, via the handle 292 as shown and/or via the magnet 282 as discussed herein, may be used to generate a floating or movement effect viewed through a packaging dome or window 296 that also acts to create an environment for the edible inflatable object 12 such that a pressure differential, caused by membrane movement, between the environment and a sealed chamber 298 of the edible inflatable object 12 causes a movement effect. The edible inflatable object 12 may rest on a grating 297 that permits air flow within the environment such that the membrane movement is able to increase or decrease pressure in the environment. The edible inflatable object 12 is able to move relative to the grating in response to pressure changes.

The disclosed edible inflatable objects 12 may be sold in individual retail packaging, e.g., trays, containers, etc., in which the consumer buys the packaging together with the edible inflatable objects 12. In addition, the disclosed techniques also may be applied to retail display arrangements that permit viewing of features of the edible inflatable objects 12. The various embodiments discussed herein may be implemented with clear packaging, e.g., packaging 296, such that effects of the system 30, e.g., lighting, actuation, are visible and able to be activated while the edible inflatable objects 12 are within the packaging. Further, while certain embodiments shown by way of example may be illustrated with a single edible inflatable object 12, it should be understood that the disclosed implementations may incorporate multiple edible inflatable objects 12.

Figure 25:
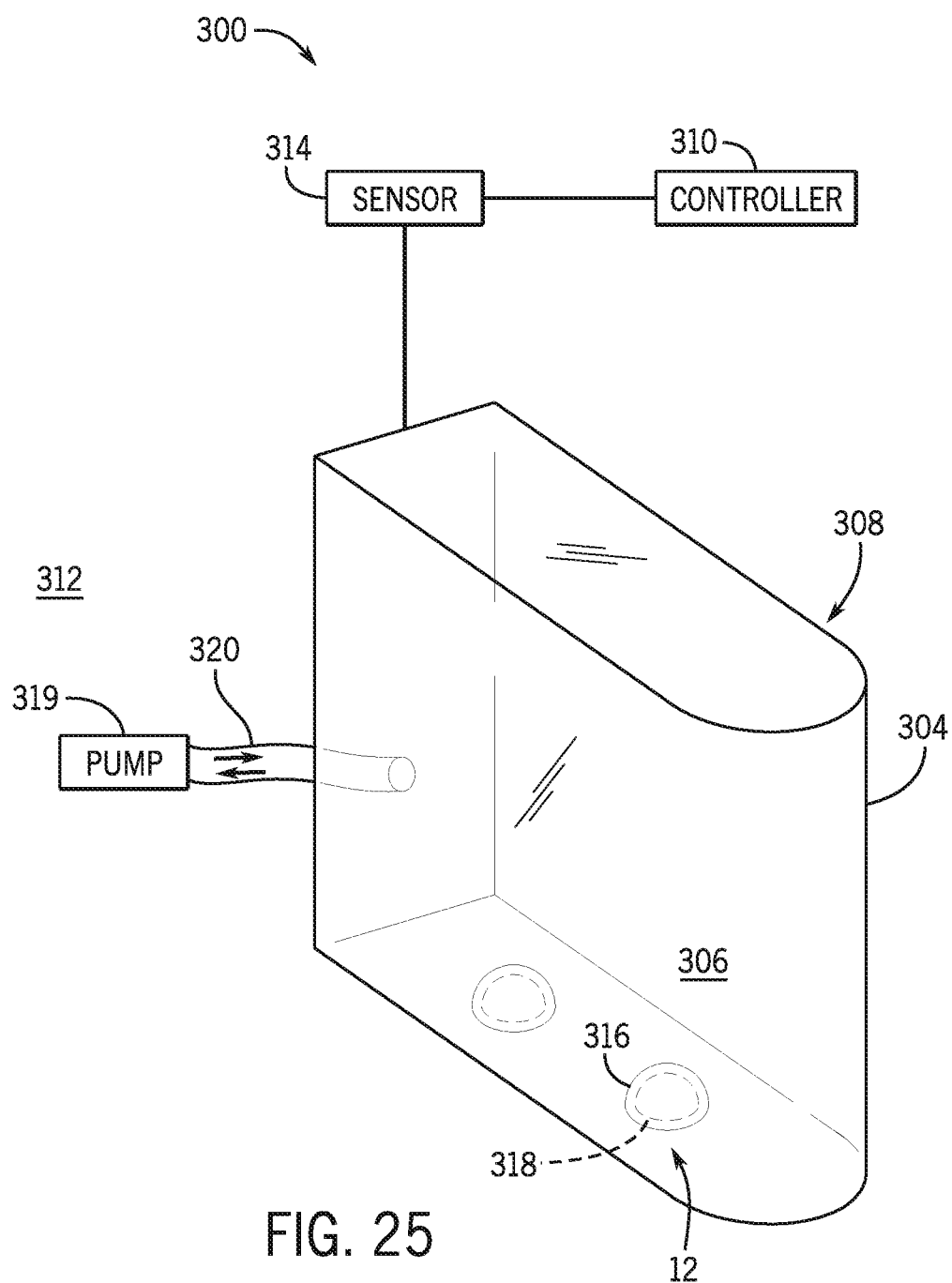
FIG. 25 is a schematic illustration of an arrangement of bulk container system for use with the edible soft robot system, in accordance with embodiments described herein.

In an embodiment, the retail display arrangements may include bulk containers, such as self-serve (or operator-served) bulk containers. The edible inflatable objects 12 may be contained within containers that facilitate actuation of the edible inflatable objects 12 within, as shown in FIG. 25, which illustrates a bulk container system 300 that includes a bulk container 304 sized and shaped to hold multiple edible inflatable objects 12 within. The edible inflatable objects 12 inside the bulk container 304 can be in a large quantity, filling the container 304. Alternatively, a separate dispensing system (conveyor, gravity powered dispenser, etc.) can deposit individual edible inflatable objects 12 into the bulk container 304 to maintain a desired number or fill level. The disclosed arrangements of the bulk container system 300 may alternatively or additionally be implemented as an individual retail packaging for sale. For example, the container 304 may be sold under some amount of vacuum, causing one-time actuation of candies when the container 304 is opened by a customer.

An interior 306 of the bulk container 304 may be accessed by a hinged lid 308 or other mechanism (e.g., a door, spring-loaded tray). The interior 306 of the bulk container may be substantially sealed or closed when the lid 308 is closed to prevent the edible inflatable objects 12 from being exposed to an ambient environment. The bulk container 304, via a reversible air pump 319, is capable of changing a pressure of the interior 306 within the bulk container 304 to cause inflation/deflation effects in the edible inflatable objects 12. In the depicted embodiment, the reversible pump 319 is fluidically coupled to the interior 306 via a conduit 320, In an embodiment, each edible inflatable object 12 includes a sealed chamber or sealed internal compartment 318 with an expandable fluid (air, etc.) inside. That is, there is no hole or inlet/outlet to access the sealed internal compartment 318 in each edible inflatable object 12. The sealed internal compartment 318 is separated (i.e., fluidically isolated) from the interior 306 within the bulk container 304 by a wall 316 of the edible inflatable object 12. The sealed internal compartment 318 may have a volume of fluid, e.g., an expandable fluid such as air, within the sealed internal compartment 318. In an embodiment, the volume of fluid sealed within the sealed internal compartment 318 may be selected so that the edible inflatable object 12 appears to be in an inactive or deflated state, e.g., relatively less inflated by default or under a first exterior pressure condition. When the container pressure in the interior 306 outside the edible inflatable object 12 changes to a second exterior pressure condition, the resulting pressure differential with the pressure of the sealed internal compartment 318 inside the candy will cause the edible inflatable object 12 to expand or contract ("inflate" or "deflate") and result in visible deformations in a shape of the wall 316.

The reversible air pump 319 is fluidically coupled via the conduit 320 to the interior 306 and operates according to instructions from a controller 310 to change or maintain a pressure of the interior 306. In an embodiment, the reversible air pump 319 removes air from the interior 306 to decrease pressure (e.g., create a vacuum) within the interior 306 to cause edible inflatable objects 12 retained within the bulk container 304 to expand based on a differential between the container pressure of the bulk container 304 and a chamber pressure of the edible inflatable object 12. In another embodiment, the reversible air pump 319 create a positive pressure state in the interior 306 to deflate the edible inflatable objects 12 within. Alternating the pump direction of the reversible air pump 319 can animate the edible inflatable objects 12 via sequential inflation and deflation patterns (e.g., pulsing).

The bulk container 304 may be arranged to include one or multiple interiors 306, each capable of assuming different container pressures relative to one another to create different simultaneous effects. With one contiguous interior 306 of the bulk container 304, all edible inflatable objects 12 in the bulk container 304 will inflate and deflate together. Multiple interiors 306 can allow for some candies to inflate while others deflate. Further, the bulk container system 300 may include multiple bulk containers under control of individual controllers 310 and/or a central controller.

In an embodiment, the bulk container 304 is maintained in a negative pressure or positive pressure environment relative to the ambient air 312 outside of the bulk container 304. In embodiments in which the system 300 creates animation effects, the same container 304 may experience both negative and positive pressure environments at different times as the pump 319 cycles or pulses between positive and negative pressure. In the case of a negative pressure environment, e.g., a vacuum condition, the lid 308 may be relatively more difficult to open than at neutral pressure (i.e., a neutral pressure that is substantially the same as the ambient environment outside of the bulk container 304). This may be addressed by selecting a negative pressure applied by the reversible pump 319 that is a high enough pressure differential to create observable changes in the edible inflatable objects 12 relative to the state of the edible inflatable objects 12 at neutral pressure but that is low enough to be easily overcome by force of a patron opening the lid 308 or other access mechanism of the bulk container 304.

The lid 308 is relatively easy to open in during positive pressure states of the interior 306 of the bulk container 304. Thus, the controller 310 alternating control of the pump 319 between suction and positive pressure creates times when lid 308 can be opened easily. Short intervals (e.g., less than 5 seconds, less than 2 seconds) between switching pump direction would allow lid 308 to be opened at some point during a typical action of a user attempting to open the lid 308.

In on embodiment, a sensor 314 (such as proximity sensor, capacitive sensor, or force feedback on lid hinge) provides feedback to the controller 310 that a user is attempting to open the lid 308, which causes the controller 310 to instruct the pump 319 to operate in positive pressure mode for a preset amount of time or while the sensor 314 senses the user reaching for the lid 308.

Figure 26:
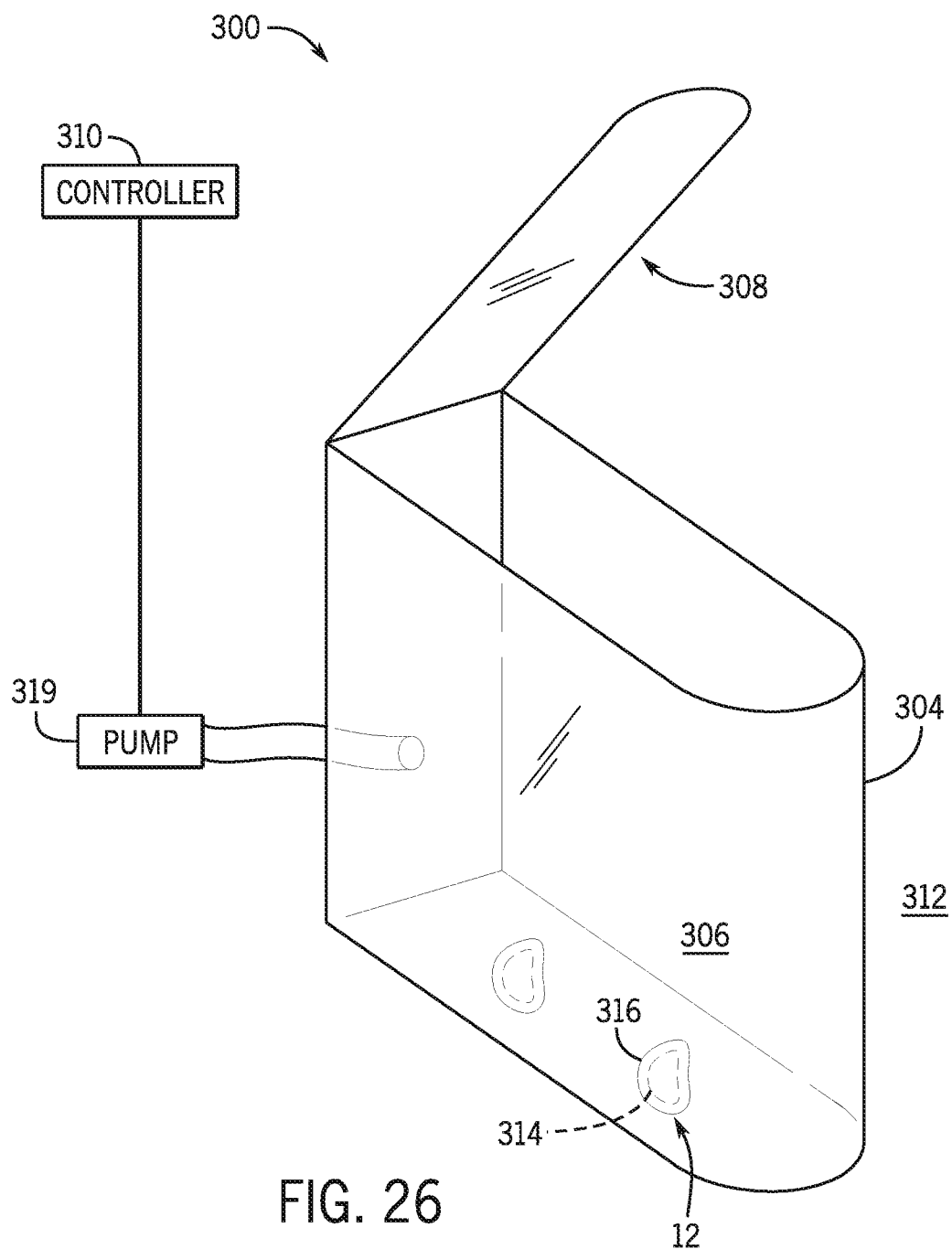
FIG. 26 is a schematic illustration of the bulk container system in an open configuration.

FIG. 26 shows the bulk container system 300 with the lid 308 in the open state. When the bulk container 304 is opened, the pressure in the interior 306 may at least partially equilibrate with the pressure in the ambient environment 312. This pressure change may cause the edible inflatable objects 12 within the bulk container 304 to change configuration when the lid 308 is opened, creating an animation effect. In the depicted examples, the closed state of the bulk container (FIG. 25) may be associated with a negative pressure that causes the edible inflatable objects 12 to be in an inflated state. Opening the lid causes the pressure to increase, which transitions the edible inflatable objects 12 to a more deflated state. When the lid 308 is open, the controller 310 may deactivate the pump 319. Alternatively, the pump 319 may remain active to compensate for pressure changes caused by the differential between the ambient pressure and the container pressure.

Figure 27:
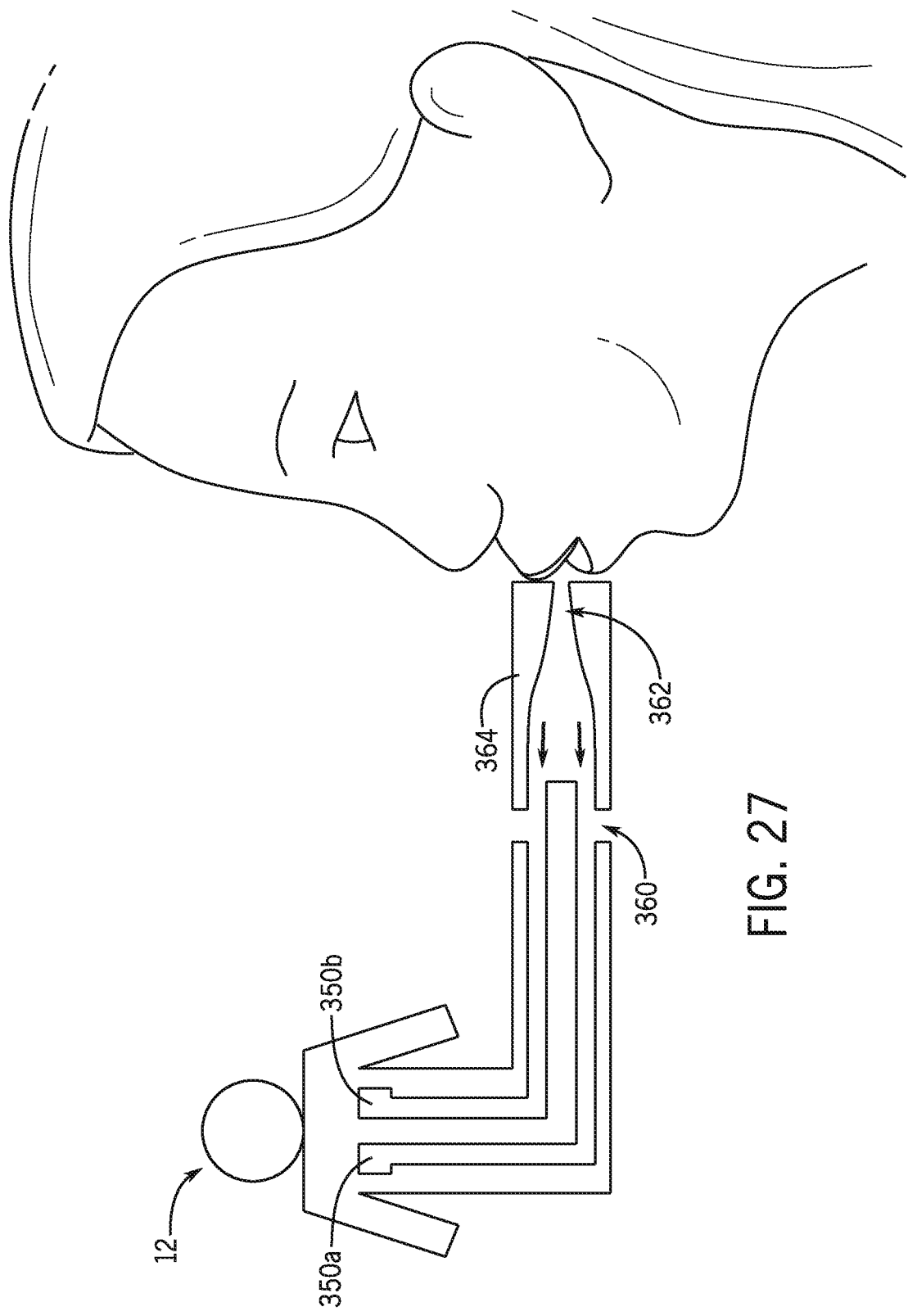
FIG. 27 is a schematic illustration of an edible inflatable object having a puppet-style configuration.

FIG. 27 is a schematic illustration of an instrument-style or puppet-style edible inflatable object 12 that is actuated by a user. In this embodiment the pneumatic pressures (positive and/or negative) are provided by the user's lungs. In the depicted example, positive pressure is provided into one or more channels 350, e.g., a left channel 350a that causes a left-side actuation of the edible inflatable object 12 and a right channel 350b that causes a right-side actuation of the edible inflatable object 12. It should be understood that other arrangements of the edible inflatable object 12 and channels 250 are encompassed in the scope of the disclosure. The edible inflatable object 12 can actuate based on the pressor provided by the user covering, uncovering, closing or opening one or more air paths 360 fluidically coupled to one or more internal channels 350. In certain embodiments, a flap or valve can actuate in response to user-provided air flow to selectively close one channel.

The edible inflatable object 12 may include a mouthpiece 264 with an internal bore 362 that is fluidically coupled to the channels 350. In an embodiment, the mouthpiece 364 is also edible, permitting the user to eat the edible inflatable object 12 starting from the mouthpiece end but retaining some actuation functionality so long as the channels 350 are preserved.

While only certain features of the invention have been illustrated and described herein, many modifications and changes will occur to those skilled in the art. It is, therefore, to be understood that the appended claims are intended to cover all such modifications and changes as fall within the true spirit of the invention. Furthermore, although the steps of the disclosed flowchart/s are shown in a given order, in certain embodiments, the depicted steps may be reordered, altered, deleted, and/or occur simultaneously.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. An edible inflatable object display system, comprising:
    an edible inflatable object configured to receive a fluid in an internal compartment of the edible inflatable object;

a container to which the edible inflatable object is reversibly coupled, wherein the reversible coupling of the edible inflatable object to the container comprises an aligned port of the edible inflatable object reversibly coupled to a fluid conduit such that the fluid conduit is fluidically coupled to the internal compartment; and a control system configured to:
receive instructions to adjust inflation of the internal compartment by activating fluid flow into or out of the internal compartment via the fluid conduit, wherein adjusting inflation of the internal compartment causes the edible inflatable object to actuate on or within the container.

2. The edible inflatable object display system of claim 1, wherein the container comprises a tray configured to hold one or more edible inflatable objects.

3. The edible inflatable object display system of claim 1, wherein the reversible coupling comprises a tether inserted into the aligned port, wherein the tether comprises the fluid conduit.

4. The edible inflatable object display system of claim 1, wherein the control system is configured to activate a special effect of the container while the edible inflatable object is actuating.

5. The edible inflatable object display system of claim 1, comprising a sensor configured to sense contact with an exterior surface of the edible inflatable object and to send the instructions to the control system based on the sensing.

6. The edible inflatable object display system of claim 1, wherein the control system is configured to heat the edible inflatable object before or during the actuating.

7. The edible inflatable object display system of claim 1, wherein the control system is configured to release fluid in the internal compartment through a release valve to cause a spraying effect.

8. The edible inflatable object display system of claim 1, wherein the control system is configured to activate fluid flow by activating a pump coupled to the fluid conduit.

9. The edible inflatable object display system of claim 1, wherein:
the aligned port of the edible inflatable object extends from an opening in an exterior surface of the edible inflatable object to the internal compartment of the edible inflatable object; and
the edible inflatable object comprises a gasket disposed about the opening, wherein the gasket comprises a recess formed within the exterior surface of the edible inflatable object.

10. The edible inflatable object display system of claim 1, wherein the control system is configured to cool the edible inflatable object before or during the actuating.

11. The edible inflatable object display system of claim 1, wherein the control system is configured to activate a projection effect of the container while the edible inflatable object is actuating.

12. The edible inflatable object display system of claim 1, wherein the control system is configured to heat or cool a fluid provided to the internal compartment of the edible inflatable object.

13. The edible inflatable object display system of claim 1, wherein the edible inflatable object comprises a valve configured to reversibly close the aligned port.

14. The edible inflatable object display system of claim 1, wherein the container comprises a tray.

* * * * *